(12) United States Patent
Takahashi et al.

(10) Patent No.: US 12,308,964 B2
(45) Date of Patent: May 20, 2025

(54) COMMUNICATION APPARATUS AND COMMUNICATION METHOD, AND PROGRAM

(71) Applicant: Sony Semiconductor Solutions Corporation, Kanagawa (JP)

(72) Inventors: Hiroo Takahashi, Kanagawa (JP); Toshihisa Hyakudai, San Diego, CA (US); Naohiro Koshisaka, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 267 days.

(21) Appl. No.: 17/417,454

(22) PCT Filed: Jan. 31, 2020

(86) PCT No.: PCT/JP2020/003610
§ 371 (c)(1),
(2) Date: Jun. 23, 2021

(87) PCT Pub. No.: WO2020/166378
PCT Pub. Date: Aug. 20, 2020

(65) Prior Publication Data
US 2022/0060282 A1    Feb. 24, 2022

(30) Foreign Application Priority Data
Feb. 15, 2019    (JP) .................. 2019-025702

(51) Int. Cl.
*H04L 12/825* (2013.01)
*G06F 11/10* (2006.01)
(Continued)

(52) U.S. Cl.
CPC .......... *H04L 1/0083* (2013.01); *H04L 1/0061* (2013.01); *H04L 45/74* (2013.01)

(58) Field of Classification Search
None
See application file for complete search history.

(56) References Cited

U.S. PATENT DOCUMENTS 5,181,017 A * 1/1993 Frey, Jr. .................. H04L 45/32
709/239
8,654,693 B2 * 2/2014 Song ...................... H04L 45/74
370/310
(Continued)

FOREIGN PATENT DOCUMENTS

CN    102469277 A    5/2012
JP    2010129018 A    6/2010
(Continued)

OTHER PUBLICATIONS

International Search Report (PCT/ISA/210), International Application No. PCT/JP2020/003610, dated Apr. 7, 2020.
(Continued)

*Primary Examiner* — Sithu Ko
(74) *Attorney, Agent, or Firm* — Michael Best & Friedrich LLP

(57) ABSTRACT

A communication apparatus, a communication method, and a non-transitory computer-readable medium. In one example, the communication apparatus includes a transmission circuitry, that, when a packet is distributed to a plurality of lanes and transmitted to a communication apparatus on a receiving side, is configured to transmit a packet header of the packet independently in each of the plurality of lanes. The packet header includes a cyclic redundancy check (CRC).

20 Claims, 16 Drawing Sheets

(51) Int. Cl.
  *H04L 1/00*       (2006.01)
  *H04L 45/74*      (2022.01)

(56) References Cited

U.S. PATENT DOCUMENTS

| | | | |
|---|---|---|---|
| 10,104,083 B2* | 10/2018 | Hebron | H04L 63/10 |
| 11,366,773 B2* | 6/2022 | Agarwal | G06F 13/1668 |
| 11,570,605 B2* | 1/2023 | Chen | H04L 1/1854 |
| 11,824,597 B2* | 11/2023 | Kim | H04B 3/542 |
| 2002/0087716 A1 | 7/2002 | Mustafa | |
| 2010/0083030 A1* | 4/2010 | Thayer | G06F 11/0745 |
| | | | 714/748 |
| 2010/0138573 A1 | 6/2010 | Sano et al. | |
| 2012/0120289 A1* | 5/2012 | Sugioka | G06T 1/0007 |
| | | | 348/294 |
| 2012/0240017 A1 | 9/2012 | Uchida | |
| 2015/0280746 A1* | 10/2015 | Sikkink | H03M 13/17 |
| | | | 714/807 |
| 2017/0117979 A1* | 4/2017 | Sengoku | H04L 45/74 |
| 2017/0220517 A1* | 8/2017 | Khan | H04B 1/40 |
| 2019/0068329 A1* | 2/2019 | Kusachi | H04L 1/203 |
| 2020/0036644 A1* | 1/2020 | Belogolovy | H04L 1/0014 |

FOREIGN PATENT DOCUMENTS

| | | | | |
|---|---|---|---|---|
| JP | 2012199724 A | 10/2012 | | |
| JP | 2017211864 A | 11/2017 | | |
| KR | 20180073578 A | 7/2018 | | |
| WO | WO-2006137480 A1 * | 12/2006 | | H04L 45/245 |
| WO | 2017069855 A1 | 4/2017 | | |

OTHER PUBLICATIONS

Notification of Transmittal of the International Search Report and the Written Opinion of the International Searching Authority, or the Declaration (PCT/ISA/220), International Application No. PCT/JP2020/003610, dated Apr. 21, 2020.

Written Opinion of the International Search Authority (PCT/ISA/237), International Application No. PCT/ JP2020/003610, dated Apr. 21, 2020.

* cited by examiner

COMMUNICATION APPARATUS AND COMMUNICATION METHOD, AND PROGRAM

TECHNICAL FIELD

The present disclosure relates to a communication apparatus and a communication method, and a program, and more particularly, to a communication apparatus and a communication method, and a program which make it possible to achieve higher reliability.

BACKGROUND ART

For Camera Serial Interface 2 (CSI-2) ver. 4.0, which is currently being standardized, amendments and studies are underway for the purpose of wider use not only for mobile devices but also for various applications such as on-board items and Internet of Things (IoT).

By the way, requirements placed on on-board cameras are different from those on mobile devices, for example, on-board cameras are required to comply with functional safety stipulated by the ISO 26262 standard. In particular, in an autonomous driving vehicle, a computer recognizes an environment on the basis of an image imaged by an on-board camera to perform autonomous traveling. Therefore, it is indispensable to have enough reliability to prevent an error from occurring in application as an on-board camera.

For example, even if a vehicle collides and some error occurs such as a disconnection of wiring which connects an on-board camera and a computer, continuous image transmission is required to be performed using another wiring which is not disconnected. This enables the computer to perform self-driving, and to evacuate the vehicle to the shoulder to stop the vehicle safely.

Furthermore, Patent Document 1 proposes a system capable of reducing the number of data buses when connecting a processing device and a plurality of image sensors by using the CSI-2 standard.

CITATION LIST

Patent Document

Patent Document 1: Japanese Patent Application Laid-Open No. 2017-211864

SUMMARY OF THE INVENTION

Problems to be Solved by the Invention

However, a packet structure in the existing CSI-2 standard is specialized for use in mobile devices, so that it is difficult to ensure the reliability required for application as on-board cameras such as those described above.

The present disclosure has been made in view of such a situation, and is intended to make it possible to achieve higher reliability.

Solutions to Problems

A communication apparatus of a first aspect of the present disclosure includes: a transmission unit that, when a packet is distributed to a plurality of lanes and transmitted to a communication apparatus on a receiving side, transmits at least one of a packet header or a packet footer of the packet independently in each of the lanes.

A communication method or a program of the first aspect of the present disclosure includes: when a packet is distributed to a plurality of lanes and transmitted to a communication apparatus on a receiving side, transmitting at least one of a packet header or a packet footer of the packet independently in each of the lanes.

In the first aspect of the present disclosure, when a packet is distributed to a plurality of lanes and transmitted to a communication apparatus on a receiving side, at least one of a packet header or a packet footer of the packet is transmitted independently in each of the lanes.

A communication apparatus of a second aspect of the present disclosure includes: a reception unit that receives a packet distributed to a plurality of lanes and transmitted from a communication apparatus on a transmitting side, in which at least one of a packet header or a packet footer of the packet is transmitted independently in each of the lanes.

A communication method or a program of the second aspect of the present disclosure includes: receiving a packet that is distributed to a plurality of lanes and transmitted from a communication apparatus on a transmitting side, in which at least one of a packet header or a packet footer of the packet is transmitted independently in each of the lanes.

In the second aspect of the present disclosure, a packet distributed to a plurality of lanes and transmitted from a communication apparatus on a transmitting side is received, and at least one of a packet header or a packet footer of the packet is transmitted independently in each of the lanes.

MODE FOR CARRYING OUT THE INVENTION

Hereinafter, specific embodiments to which the present technology is applied will be described in detail with reference to the drawings.

<First Example Configuration of Communication System>

Figure 1:
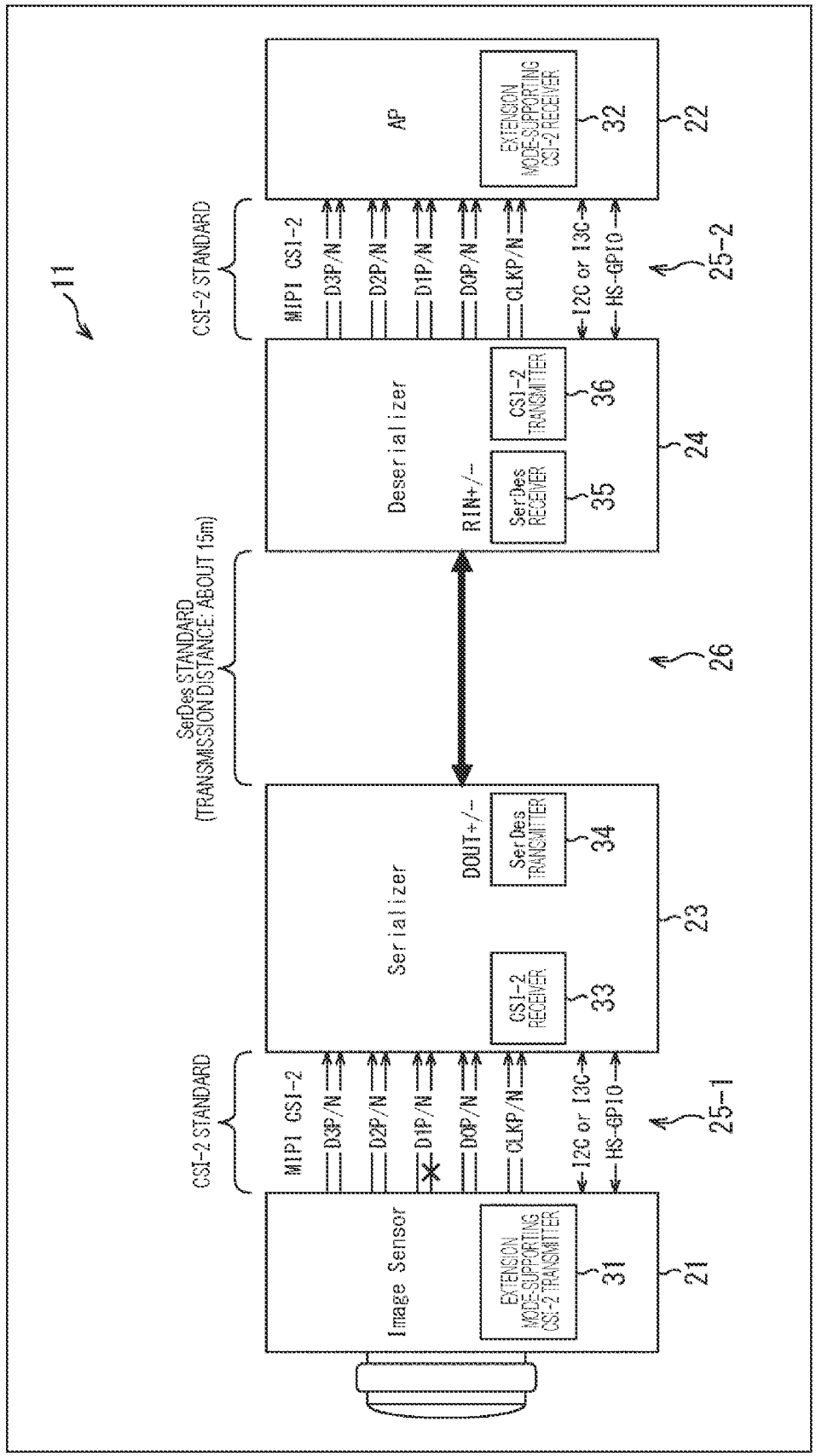
FIG. 1 is a block diagram illustrating an example configuration of a first embodiment of a communication system to which the present technology is applied.

FIG. 1 is a block diagram illustrating an example configuration of a first embodiment of a communication system to which the present technology is applied.

As illustrated in FIG. 1, a communication system 11 includes an image sensor 21, an application processor 22, a serializer 23, and a deserializer 24. Then, the image sensor 21 and the serializer 23 are connected via a bus 25-1, the application processor 22 and the deserializer 24 are connected via a bus 25-2, and the serializer 23 and the deserializer 24 are connected via a bus 26. For example, the communication system 11 is used for connection in an existing on-board camera.

The image sensor 21 is configured by incorporating an extension mode-supporting CSI-2 transmitter 31 together with, for example, a lens and an imaging element (neither thereof illustrated). For example, the image sensor 21 transmits image data of an image acquired by imaging by the imaging element to the application processor 22 by the extension mode-supporting CSI-2 transmitter 31.

The application processor 22 is configured by incorporating an extension mode-supporting CSI-2 receiver 32 together with a large scale integration (LSI) which performs a process depending on various applications executed by a mobile device including the communication system 11. For example, the application processor 22 can receive image data transmitted from the image sensor 21 by the extension mode-supporting CSI-2 receiver 32, and can perform a process on the image data depending on the application by the LSI.

The serializer 23 includes a CSI-2 receiver 33 and a serializer deserializer (SerDes) transmitter 34. For example, the serializer 23 acquires a bit parallel signal transmitted from the image sensor 21 by the CSI-2 receiver 33 communicating with the extension mode-supporting CSI-2 transmitter 31 in conformity with the normal CSI-2 standard. Then, the serializer 23 converts the acquired signal into a bit serial signal, and the signal is transmitted to the deserializer 24 by the SerDes transmitter 34 communicating with a SerDes receiver 35 in one lane.

The deserializer 24 includes the SerDes receiver 35 and a CSI-2 transmitter 36. For example, the deserializer 24 acquires a bit serial signal transmitted by the SerDes receiver 35 communicating with the SerDes transmitter 34 in one lane. Then, the deserializer 24 converts the acquired signal into a bit parallel signal, and the signal is transmitted to the application processor 22 by the CSI-2 transmitter 36 communicating with the extension mode-supporting CSI-2 receiver 32 in conformity with the normal CSI-2 standard.

The buses 25-1 and 25-2 are communication paths which transmit signals in conformity with the CSI-2 standard, and for example, a transmission distance which is a distance at which signals can be transmitted is about 30 cm. Furthermore, as illustrated in the figure, the bus 25 connects the image sensor 21 and the application processor 22 with a plurality of signal lines (HS-GPIO, I2C or I3C, CLKP/N, DOP/N, D1P/N, D2P/N, and D3P/N).

The bus 26 is a communication path which transmits signals in conformity with a SerDes standard other than the CSI-2, such as flat panel display (FPD)-link III, and for example, a transmission distance which is a distance at which signals can be transmitted is about 15 m.

Figure 3:
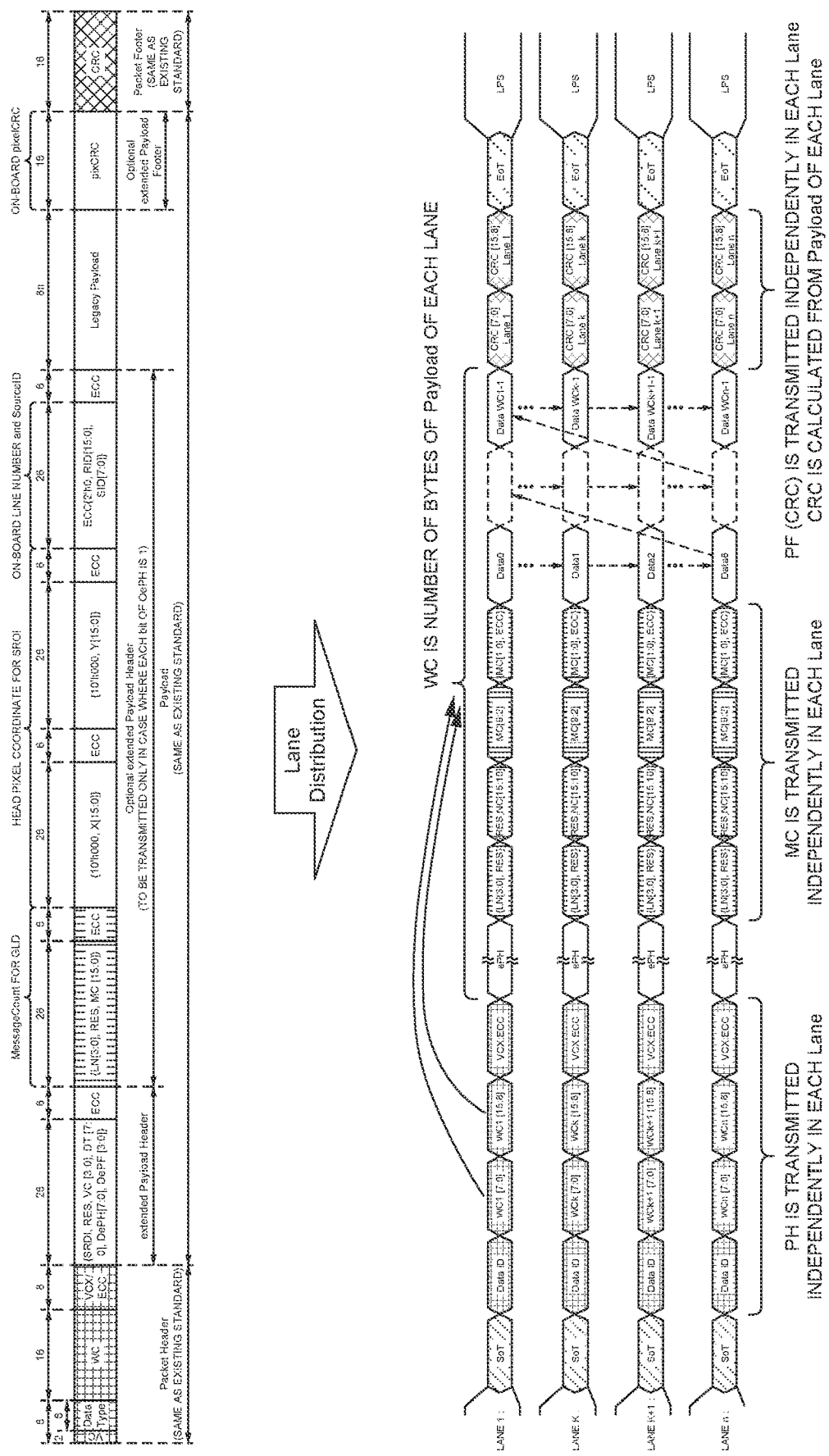
FIG. 3 is an explanatory diagram of a packet structure and a parallel transmission setting of an extended packet.

Here, in the communication system 11, the extension mode-supporting CSI-2 transmitter 31 and the extension mode-supporting CSI-2 receiver 32 support communication in the extension mode in which the CSI-2 standard is extended, and can transmit and receive, for example, packets used in the extension mode (hereinafter referred to as extended packets) as illustrated in FIG. 3 as described later. For example, the extension mode-supporting CSI-2 receiver 32 has an error recognition function of recognizing an error which occurs on the bus 25-2 on the basis of an extended packet transmitted via the bus 25-2. Note that detailed configurations of the extension mode-supporting CSI-2 transmitter 31 and the extension mode-supporting CSI-2 receiver 32 will be described later with reference to FIGS. 5 and 6.

Furthermore, in the communication system 11, the CSI-2 receiver 33 has an error recognition function of recognizing an error which occurs on the bus 25-1 on the basis of an extended packet transmitted via the bus 25-1. Note that a detailed configuration of the CSI-2 receiver 33 will be described later with reference to FIG. 7.

By the way, in a case where the communication system 11 is adopted in on-board cameras such as those described above, higher reliability is required, for example, continuous communication can be performed quickly even if a defect occurs, and therefore, it is necessary to take measures to deal with two points described below.

Figure 2:
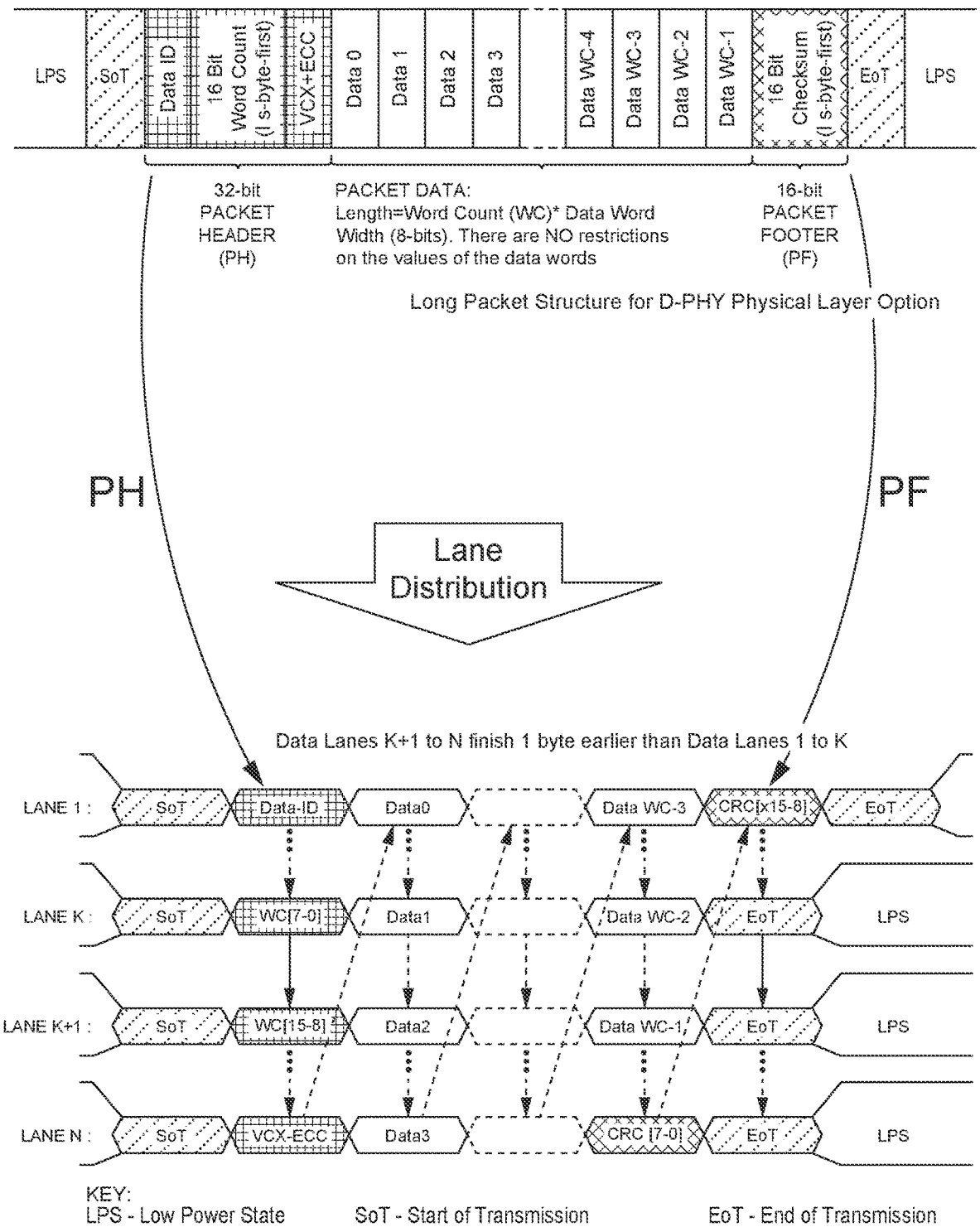
FIG. 2 is an explanatory diagram of a conventional packet structure and lane distribution.

Conventionally, a packet transmitted from the image sensor 21 to the application processor 22 has a packet structure as illustrated in FIG. 2, for example, and is distributed to a plurality of lanes and transmitted.

An upper side of FIG. 2 illustrates, as an example of a packet transmitted from the image sensor 21 to the application processor 22, a packet structure of a CSI-2 long packet for D-PHY when D-PHY is used for a physical layer. Furthermore, a lower side of FIG. 2 illustrates a state where the CSI-2 long packet for D-PHY is subjected to distribution to N lanes (lane distribution) and transmitted.

Then, as illustrated in FIG. 2, both a packet header (PH) and a packet footer (PF) are conventionally distributed to the plurality of lanes and transmitted in parallel. Therefore, in a case where an error occurs in any of these lanes, it may not be possible to identify the lane in which the error has occurred.

For example, in a case where a 1-bit error occurs in packet data, a CRC error is detected in accordance with the existing CSI-2 standard. However, since the packet structure has only one CRC for the entire packet, it has not been possible for a receiving side to identify in which lane the 1-bit error has occurred. Therefore, it has not been possible for the application processor 22 to separate a specific lane in which an error occurs frequently and to perform continuous communication again only in normal lanes other than the lane.

Accordingly, in a case where the communication system 11 is adopted in on-board cameras, it is necessary to take measures which make it possible to identify a lane in which an error has occurred.

Furthermore, for example, in a case where a signal line D1P/N marked with a cross in FIG. 1 is disconnected, it has not been possible for the receiving side to immediately detect which lane has been disconnected. Similarly, in a case where SYNC is lost due to a bit error or the like occurring in the signal line D1P/N, it has not been possible for the receiving side to immediately detect in which lane the bit error has occurred to cause the SYNC to be lost.

For example, the serializer 23 is configured on the premise that in a case where a CRC error occurs in a payload, data can be output from the SerDes transmitter 34 even with the error.

On the other hand, in a case where any of the lanes is disconnected or a case where the SYNC is lost due to a bit error occurring in any of the lanes, the serializer 23 cannot receive the payload itself and cannot output data from the SerDes transmitter 34. That is, while the 1-bit error can be corrected by a Hamming code, in a case where a 2-bit error is detected (SECDED), the serializer 23 cannot correctly receive word count (WC: data length of payload) in the packet header. Therefore, the serializer 23 does not know the length of the payload, and cannot output data from the SerDes transmitter 34 similarly to a case of a disconnection.

Then, in a case where Sync loss simply due to garbled bits occurs, or a case where an error of 2 bits or more occurs in the packet header, it is not possible to determine in which lane packet loss has occurred even if communication is restored in the next packet. Therefore, a separate inquiry is required using the I2C or the like, and a delay occurs before continuous communication is performed while avoiding a lane with a high error frequency.

Furthermore, in a case where a disconnection occurs, an application processor 22 side cannot receive any communication thereafter. Therefore, the application processor 22 in a subsequent stage considers the possibility of a disconnection after the elapse of a certain period of time, and reads a registry setting of the serializer 23 using the I2C or the like, and thereby a disconnection error can be detected, but a delay will occur by then. In on-board cameras, this delay is expected to be fatal.

Accordingly, in a case where the communication system 11 is adopted in on-board cameras, it is necessary to take measures which make it possible to immediately detect the occurrence of a defect and to perform continuous communication without delay.

For this reason, the communication system 11 is configured so that a lane in which an error has occurred can be identified, and the occurrence of a defect can be immediately detected to perform continuous communication without delay.

For example, in the communication system 11, an extended packet (CSI-2 long packet for D-PHY) having a packet structure such as that illustrated in an upper side of FIG. 3 is transmitted from the extension mode-supporting CSI-2 transmitter 31 to the extension mode-supporting CSI-2 receiver 32. Then, in the communication system 11, as illustrated in a lower side of FIG. 3, a state where the extended packet is subjected to distribution to N lanes (lane distribution) and transmitted is illustrated.

For example, in the extended packet, the packet header and the packet footer have the same packet structure as that in the existing CSI-2 standard. For example, the packet header stores virtual channel (VC) indicating the number of virtual channel lines, data type indicating a type of data, word count (WC) indicating a data length of a payload, and VCX/ECC. Furthermore, the packet footer stores cyclic redundancy check (CRC).

Here, regarding the data type transmitted in the packet header, the existing CSI-2 standard defines 0x38 to 0x3F as reserved. For this reason, in the extended packet for D-PHY, setting information for identifying the extension mode on the receiving side is newly defined by using data type defined as reserved in the existing CSI-2 standard.

For example,
in a case of DataType [5:3]=3'b111, extension mode
DataType [2]=Reserve (RES: Reservation for future extension)
DataType [1:0]=extension mode type (four extension modes are prepared)
are defined as data type.

That is, among data types 0x38 to 0x3F defined as reserved in the existing CSI-2 standard, for example, DataType [5:3] is defined as extension mode setting information, and DataType [1:0] is defined as extension type setting information. The extension mode setting information indicates whether or not it is the extension mode, and indicates that it is the extension mode, for example, in a case where DataType [5:3] is 3'b111. Furthermore, when four types of extension mode, i.e., extension mode 0, extension mode 1, extension mode 2, and extension mode 3 are prepared as types of extension modes, the extension type setting information indicates which type of extension mode it is among the four types of extension mode. For example, in a case where DataType [1:0] is 2'b00, it is indicated that the type of extension mode is extension mode 0.

Then, in extension mode 0 (DataType [1:0]=2'b00), for example, a packet structure in which a payload is separated into four is defined. That is, as illustrated in FIG. 3, the payload in extension mode 0 is separated into an extended payload header (ePH), an optional extended payload header (OePH), a legacy payload, and an optional extended payload footer (OePF).

The extended payload header is placed at the head corresponding to a payload of the existing CSI-2 standard, and is required to be transmitted without fail in the extension mode. For example, the extended payload header includes setting information such as SROI identification flag, extended virtual channel (VC), extended data type, OePH selection flag, and OePF selection flag, as illustrated in the figure. Here, the extended VC extends the VC, which was 4 bits in the existing CSI-2 standard, to 8 bits, and the extended data type extends the data type, which was 4 bits in the existing CSI-2 standard, to 8 bits.

For example, in a packet for D-PHY, the VC of the existing packet header already exists in 4 bits, and by defining the extended VC of the extended payload header as 4 bits, the total thereof can be 8 bits. Specifically, definitions can be given as OePH [7:0]={5'h00, RSID, XY POS, MC} and OePF [3:0]={3'h0, pCRC}, and it is possible to control ON/OFF of various packet transmissions required for respective applications.

The optional extended payload header and the optional extended payload footer are selectively transmitted depending on the applications.

The legacy payload corresponds to the same payload as that in the existing CSI-2 standard.

As described above, by setting the extended payload header, the optional extended payload header, and the optional extended payload footer as needed, it becomes possible to transmit data corresponding to various applications. Furthermore, data transmitted with the extended payload header, the optional extended payload header, and the optional extended payload footer is 26 bits+6-bit error correction code (ECC). Therefore, it is possible to divert an existing payload header circuit to suppress an increase in a circuit scale and to improve error tolerance.

Then, in the communication system 11, the packet header is copied depending on the number of multiple lanes without performing lane distribution of the packet header, and the packet header is transmitted independently in each lane. Then, in order to allow the payload to be reproduced in each lane on the receiving side, only the word count (WC)

included in the packet header is changed from the existing CSI-2 standard to be newly defined so as to indicate the number of bytes of the payload in each lane.

Furthermore, in the communication system 11, CRC to be a packet footer is calculated independently for each payload in each lane without performing lane distribution of the packet footer, and the packet footer is transmitted independently in each lane.

Moreover, in the communication system 11, lane distribution of message count for GLD (MC) included in the payload is not performed and the MC is transmitted independently in each lane, similarly to the packet header. At that time, in the communication system 11, a lane number (LN) indicating via which lane the MC has been transmitted is also transmitted by incrementing (+1) each time the MC is transmitted. Note that as illustrated in FIG. 3, the MC is placed in the optional extended payload header (OePH). Note that transmission of the LN is not essential, and the LN is only required to be transmitted as needed.

Furthermore, FIG. 3 illustrates an example in which the packet header (PH), the extended payload header (ePH), the OePH, the optional extended payload footer (OePF), and the packet footer (PF) are copied and transmitted in each lane. Then, in this example, lane distribution is performed for only the legacy payload on a transmitting side.

Note that as described with reference to FIG. 3, the setting for independently transmitting the packet header, the WC, and the packet footer in each lane (hereinafter referred to as parallel transmission setting) is substantially an essential function in a case of adopting the communication system 11 in on-board cameras, and therefore, there is no need to perform dynamic on/off switching. Accordingly, in the communication system 11, the application processor 22 is configured to turn on/off this parallel transmission setting with respect to a registry of the image sensor 21 at the start of communication.

Accordingly, the communication system 11 can have an error recognition function of recognizing in which lane an error has occurred and the type of error that has occurred. Furthermore, in a case where the CSI-2 receiver 33 recognizes an error, the CSI-2 receiver 33 notifies the application processor 22 of error information associated therewith.

Figure 4:
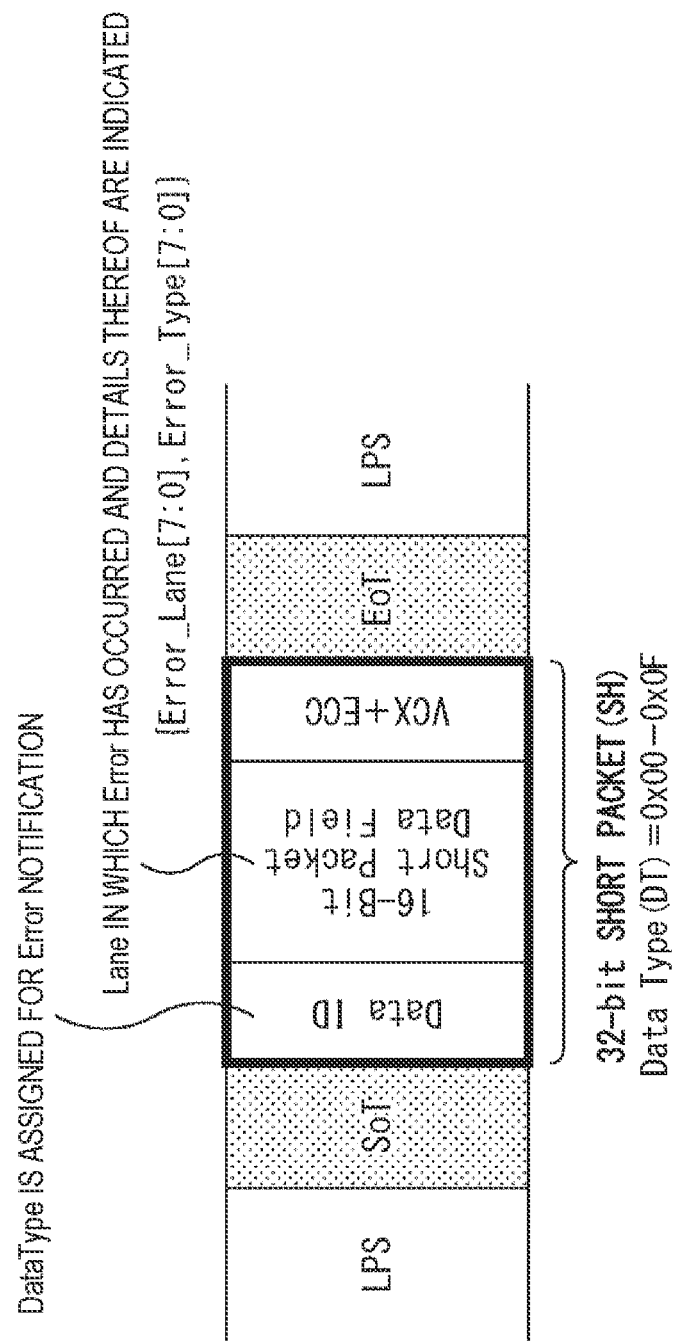
FIG. 4 is a diagram illustrating an example of a packet structure of a short packet used for error notification.

FIG. 4 illustrates a packet structure of a CSI-2 short packet used to notify the application processor 22 of the error information from the CSI-2 receiver 33.

For example, as illustrated in FIG. 4, data type (=0x00-0x0F) for notification of occurrence of an error is assigned to a data ID of the CSI-2 short packet.

Furthermore, a lane in which the error has occurred and details of the error {Error_Lane [7:0], Error_Type [7:0]} are stored in a data field of the CSI-2 short packet. For example, Error_Lane [7:0] indicates the lane in which the error has occurred. As an example, Error_Lane [0] indicates that an error has occurred in Lane 1, and Error_Lane [1] indicates that an error has occurred in Lane 2. Furthermore, Error_Type [7:0] indicates the type of error which has occurred in any lane. As an example, Error_Type [0] indicates Sync loss and Error_Type indicates PH error.

Specifically, in a case where normal reception can be performed in Lane 1, Sync loss has occurred in Lane 2, normal reception can be performed in Lane 3, and PH error has occurred in Lane 4, {8'b0000_1010, 8'b0000_0011} is stored in the data field of the CSI-2 short packet.

<Example Configurations of Image Sensor, Application Processor, and Serializer>

Figure 5:
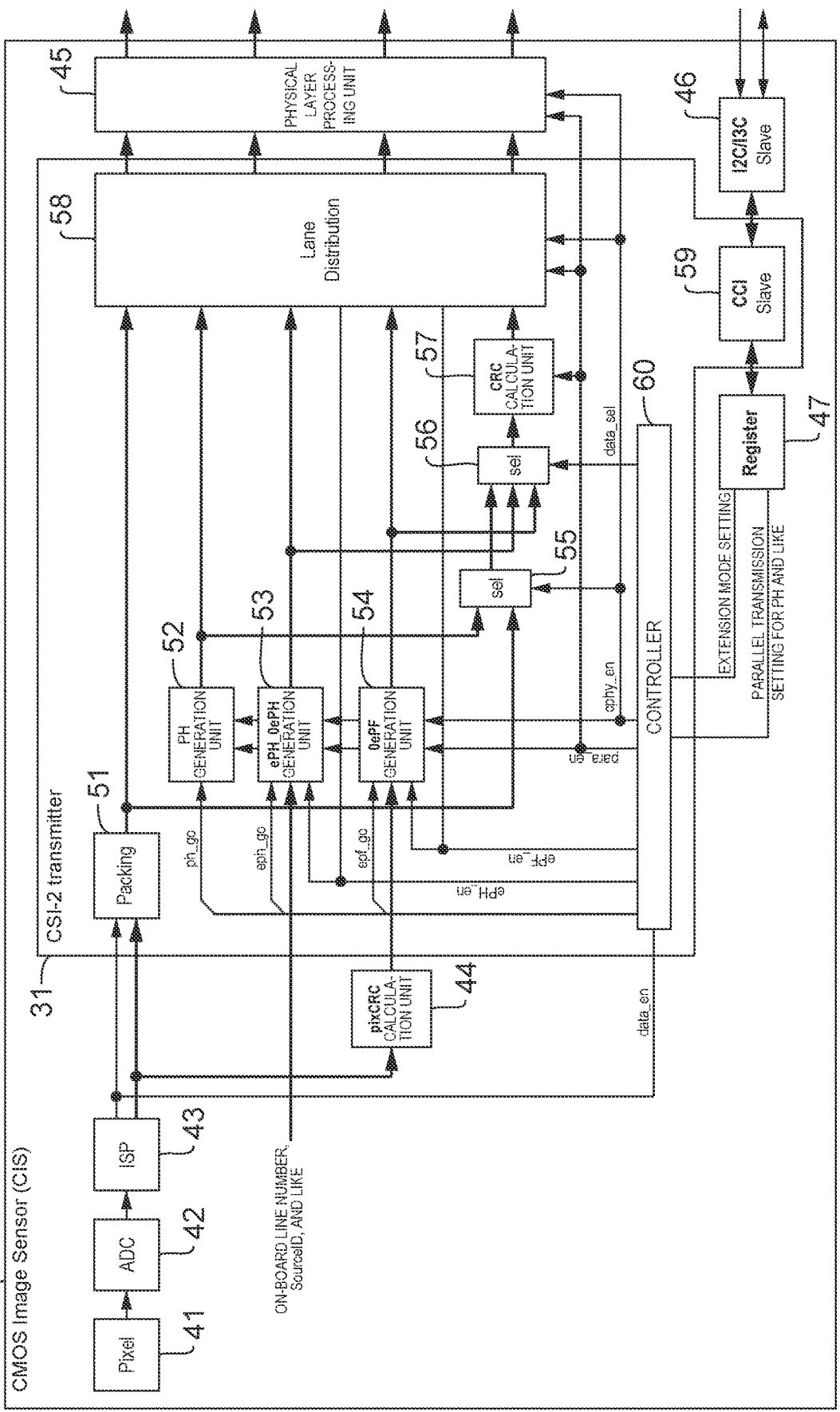
FIG. 5 is a block diagram illustrating an example configuration of an image sensor.

FIG. 5 is a block diagram illustrating an example configuration of the image sensor 21 including the extension mode-supporting CSI-2 transmitter 31.

As illustrated in FIG. 5, in addition to the extension mode-supporting CSI-2 transmitter 31, the image sensor 21 includes a pixel 41, an AD converter 42, an image signal processor 43, a pixel CRC calculation unit 44, a physical layer processing unit 45, an I2C/I3C slave 46, and a register 47. Furthermore, the extension mode-supporting CSI-2 transmitter 31 includes a packing unit 51, a packet header generation unit 52, a payload header generation unit 53, a payload footer generation unit 54, selectors 55 and 56, a CRC calculation unit 57, a lane distribution unit 58, a CCI slave 59, and a controller 60.

The pixel 41 outputs an analog pixel signal depending on the amount of received light, and the AD converter (analog-to-digital converter (ADC)) 42 digitally converts the pixel signal output from the pixel 41 and supplies the pixel signal to the image signal processor 43. The image signal processor (ISP) 43 supplies, to the pixel CRC calculation unit 44 and the packing unit 51, image data obtained by performing various image processes on an image based on the pixel signal. Furthermore, the image signal processor 43 supplies, to the packing unit 51 and the controller 60, a data enable signal data_en indicating whether or not the image data is valid.

The pixel CRC calculation unit 44 calculates and obtains CRC for each pixel in the image data supplied from the image signal processor 43, and supplies the CRC to the payload footer generation unit 54.

The physical layer processing unit 45 can execute both C-PHY and D-PHY physical layer processes. For example, the physical layer processing unit 45 executes the C-PHY physical layer process in a case where a C-layer enable signal cphy_en supplied from the controller 60 is valid, and executes the D-PHY physical layer process in a case where the C-layer enable signal cphy_en is invalid. Then, the physical layer processing unit 45 transmits a packet divided into four lanes by the lane distribution unit 58 to the application processor 22.

On the basis of the inter-integrated circuit (I2C) or improved inter-integrated circuit (I3C) standard, the I2C/I3C slave 46 performs communication following the lead of an I2C/I3C master 72 (FIG. 6) of the application processor 22.

Various settings transmitted from the application processor 22 are written to the register 47 via the I2C/I3C slave 46 and the CCI slave 59. Here, as the settings to be written to the register 47, for example, a communication setting in conformity with the CSI-2 standard, an extension mode setting indicating whether or not the extension mode is used, and a fixed communication setting required for communication in the extension mode are exemplified.

The packing unit 51 performs a packing process of storing the image data supplied from the image signal processor 43 in a payload of the packet, and supplies the payload to the selector 55 and the lane distribution unit 58.

When the packet header generation unit 52 is instructed to generate a packet header in accordance with a packet header generation instruction signal ph_go supplied from the controller 60, the packet header generation unit 52 generates a packet header including WC indicating the number of bytes of the payload in each lane, and supplies the packet header to the selector 55 and the lane distribution unit 58.

That is, in conformity with the existing CSI-2 standard, the packet header generation unit 52 generates a packet header for storing setting information indicating conditions set for data to be transmitted in the packet, for example, data type indicating the type of data. Furthermore, the packet header generation unit 52 stores, in an unused region defined as unused in the existing CSI-2 standard in the data type which is setting information indicating the type of data to be transmitted in the packet, extension mode setting information indicating whether or not the extension mode uses an extended header. Moreover, the packet header generation unit 52 stores, in the unused region, extension type setting information indicating which type of extension mode it is among the plurality of types of extension modes prepared as the extension mode.

The payload header generation unit 53 generates each of an extended payload header and an optional extended payload header in accordance with an extended payload header generation instruction signal eph_go and an extended payload header enable signal ePH_en supplied from the controller 60, and supplies the extended payload header and the optional extended payload header to the selector 56 and the lane distribution unit 58. Furthermore, the payload header generation unit 53 is supplied with an on-board line number, a source identification (ID), and the like depending on the application of the image sensor 21, and if necessary, stores the on-board line number, the source identification (ID), and the like in the extended payload header or the optional extended payload header.

That is, the payload header generation unit 53 generates, for example, an extended payload header such as that illustrated in FIG. 3, separately from the packet header generated by the packet header generation unit 52. Moreover, in a case of transmitting the optional extended header, the payload header generation unit 53 stores, in the extended header, as optional extended header setting information (OePH [7:0]) indicating whether or not to transmit the optional extended header, optional extended header setting information indicating that the optional extended header is transmitted, and generates the extended header followed by the optional extended header.

The payload footer generation unit 54 generates an optional extended payload footer in accordance with an extended payload footer generation instruction signal epf_go and an extended payload footer enable signal ePF_en supplied from the controller 60, and supplies the optional extended payload footer to the selector 56 and the lane distribution unit 58.

That is, in a case where the packet transmitted in the extension mode is an extended long packet which stores data transmitted as a payload in the existing CSI-2 standard, the payload footer generation unit 54 generates an optional extended payload footer placed subsequent to the legacy payload in which the data is stored.

Furthermore, the C-layer enable signal cphy_en is supplied from the controller 60 to the packet header generation unit 52, the payload header generation unit 53, and the payload footer generation unit 54. Then, in a case where the C-layer enable signal cphy_en is valid, the packet header generation unit 52 generates a packet header for C-PHY, the payload header generation unit 53 generates an extended payload header and an optional extended payload header for C-PHY, and the payload footer generation unit 54 generates an optional extended payload footer for C-PHY. On the other hand, in a case where the C-layer enable signal cphy_en is invalid, the packet header generation unit 52 generates a packet header for D-PHY, the payload header generation unit 53 generates an extended payload header and an optional extended payload header for D-PHY, and the payload footer generation unit 54 generates an optional extended payload footer for D-PHY.

In accordance with the C-layer enable signal cphy_en supplied from the controller 60, in a case where the C-layer enable signal cphy_en is valid, the selector 55 selects a packet header supplied from the packet header generation unit 52 and supplies the packet header to the selector 56. On the other hand, in a case where the C-layer enable signal cphy_en is invalid, the selector 55 selects a payload supplied from the packing unit 51 and supplies the payload to the selector 56.

In accordance with the data selection signal data_sel supplied from the controller 60, the selector 56 selects any of the packet header or the payload selectively supplied via the selector 55, the extended payload header and the optional extended payload header supplied from the payload header generation unit 53, and the optional extended payload footer supplied from the payload footer generation unit 54, and supplies the selected one to the CRC calculation unit 57.

The CRC calculation unit 57 calculates and obtains CRC of the packet header, the payload, the extended payload header, the optional extended payload header, or the optional extended payload footer selectively supplied via the selector 56, and supplies the CRC to the lane distribution unit 58.

In accordance with the control of the controller 60, the payload supplied from the packing unit 51, the packet header supplied from the packet header generation unit 52, the extended payload header and the optional extended payload header supplied from the payload header generation unit 53, the optional extended payload footer supplied from the payload footer generation unit 54, and the CRC supplied from the CRC calculation unit 57 are distributed by the lane distribution unit 58 to four lanes in conformity with the CSI-2 standard and supplied to the physical layer processing unit 45.

On the basis of the CSI-2 standard, the camera control interface (CCI) slave 59 performs communication following the lead of a CCI master 88 (FIG. 6) of the application processor 22.

The controller 60 reads various settings stored in the register 47 and controls each block constituting the extension mode-supporting CSI-2 transmitter 31 in accordance with the settings. For example, the controller 60 controls switching between transmission of a packet having a packet structure in conformity with the existing CSI-2 standard and transmission of a packet having a packet structure in the extension mode depending on the content of the data to be transmitted.

Then, in the image sensor 21, the parallel transmission setting, which is a communication setting for setting the parallel transmission such as that described with reference to FIG. 3 described above, is written from the application processor 22 to the register 47. Therefore, the controller 60 refers to the parallel transmission setting of the register 47, and supplies a parallel transmission enable signal para_en indicating whether or not the parallel transmission is valid to the packet header generation unit 52, the payload header generation unit 53, the CRC calculation unit 57, the lane distribution unit 58, and the physical layer processing unit 45.

For example, in a case where the parallel transmission enable signal para_en is valid, the packet header generation unit 52 generates (copies) a packet header for each lane, and the payload header generation unit 53 generates an MC and an LN for each lane. Furthermore, in this case, the CRC calculation unit 57 calculates CRC from a payload in each lane to generate a packet footer, and the lane distribution unit 58 appropriately distributes objects to be transmitted to each of these lanes.

The image sensor 21 is configured as described above, and can transmit packets to the application processor 22 by parallel transmission such as that described with reference to FIG. 3.

Furthermore, the image sensor 21 can generate an extended packet having a packet structure such as that illustrated in FIG. 3 and transmit the extended packet to the application processor 22.

Figure 6:
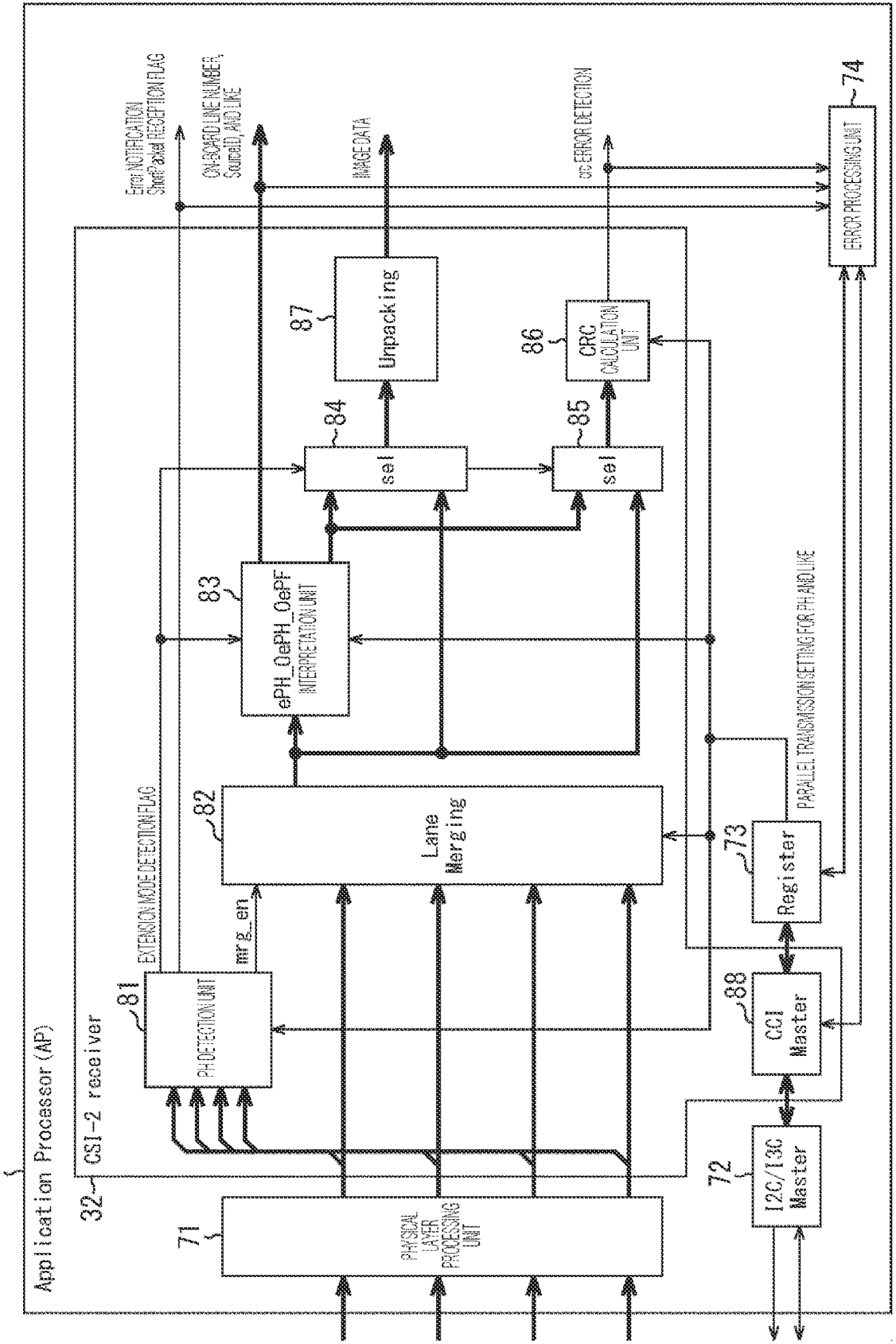
FIG. 6 is a block diagram illustrating an example configuration of an application processor.

FIG. 6 is a block diagram illustrating an example configuration of the application processor 22 including the extension mode-supporting CSI-2 receiver 32.

As illustrated in FIG. 6, in addition to the extension mode-supporting CSI-2 receiver 32, the application processor 22 includes a physical layer processing unit 71, the I2C/I3C master 72, a register 73, and an error processing unit 74. Furthermore, the extension mode-supporting CSI-2 receiver 32 includes a packet header detection unit 81, a lane merging unit 82, an interpretation unit 83, selectors 84 and 85, a CRC calculation unit 86, an unpacking unit 87, and the CCI master 88.

The physical layer processing unit 71 can execute both C-PHY and D-PHY physical layer processes. As described above, the physical layer processing unit 45 of the image sensor 21 performs a physical layer process of either C-PHY or D-PHY, and the physical layer processing unit 71 executes the same physical layer process as that executed in the physical layer processing unit 45.

The I2C/I3C master 72 takes the lead in communicating with the 2C/I3C slave 46 (FIG. 5) of the image sensor 21 on the basis of the I2C or I3C standard.

In the register 73, various settings to be written to the register 47 of the image sensor 21 are recorded.

The error processing unit 74 is supplied with an error notification short packet reception flag output from the packet header detection unit 81, a crc error detection signal output from the CRC calculation unit 86, and message count for GLD (MC) and an LN output from the interpretation unit 83. Then, the error processing unit 74 can perform an error process as described later with reference to the flowchart of FIG. 12 to identify a target lane in which a disconnection occurs or an error occurs frequently, and can write a setting which stops use of the target lane to the register 73. Furthermore, the error processing unit 74 sets, for example, a decrease in communication speed as a result of stopping the use of the target lane with respect to the CCI master 88, or causes the CCI master 88 to perform communication for causing a restoration process of the target lane to be performed.

The packet header detection unit 81 detects a packet header from a packet supplied from the physical layer processing unit 71, and checks a data type stored in the packet header. Then, in a case where the extension mode setting information indicates that it is the extension mode in the data type of the packet header (DataType [5:3]=3'b111), the packet header detection unit 81 supplies an extension mode detection flag indicating the extension mode to the interpretation unit 83, the selector 84, and the selector 85. Furthermore, the packet header detection unit 81 supplies, to the lane merging unit 82, a merging enable signal mrg_en indicating whether or not merging of divided four lanes is valid on the basis of the packet header.

That is, in conformity with the existing CSI-2 standard, the packet header detection unit 81 detects a packet header which stores the setting information (data type and the like) indicating conditions set for data to be transmitted in the packet. At that time, the packet header detection unit 81 outputs the extension mode detection flag in accordance with extension mode setting information indicating whether or not the extension mode uses an extended header, the extension mode setting information being stored in the unused region defined as unused in the existing CSI-2 standard in the data type which is the setting information indicating the type of data to be transmitted in the packet, thereby causing switching to be performed between reception of a packet having a packet structure in conformity with the existing CSI-2 standard and reception of a packet having a packet structure in the extension mode. Furthermore, in accordance with extension mode type information stored in the unused region of the data type defined as unused in the existing CSI-2 standard, the packet header detection unit 81 recognizes which type of extension mode it is among the plurality of types of extension modes prepared as the extension mode.

In a case where the merging enable signal mrg_en supplied from the packet header detection unit 81 is valid, the lane merging unit 82 receives and merges the packet divided into four lanes supplied from the physical layer processing unit 71. Then, the lane merging unit 82 supplies the packet of one lane to the interpretation unit 83, the selector 84, and the selector 85.

In a case where the extension mode detection flag supplied from the packet header detection unit 81 indicates that it is the extension mode, the interpretation unit 83 reads the extended payload header, the optional extended payload header, and the optional extended payload footer from the packet supplied from the lane merging unit 82 on the basis of a packet structure in the extension mode. Then, the interpretation unit 83 interprets the setting information stored in the extended payload header, the optional extended payload header, and the optional extended payload footer.

That is, the interpretation unit 83 receives, as an extended header, an extended payload header placed at the head of a payload in conformity with the existing CSI-2 standard, and interprets setting information stored in the extended payload header. Furthermore, in a case where the optional extended header setting information stored in the extended header indicates that the optional extended header which is selectively transmitted depending on the application is transmitted, the interpretation unit 83 receives the extended header followed by the optional extended header and interprets setting information stored in the optional extended header. Moreover, in a case where the packet transmitted in the extension mode is an extended long packet which stores data transmitted as a payload in the existing CSI-2 standard, the interpretation unit 83 receives an optional extended payload footer placed subsequent to a legacy payload in which the data is stored, and interprets the optional extended payload footer.

Then, the interpretation unit 83 reads and outputs, for example, an on-board line number and a source ID stored in the optional extended payload header to an LSI (not illustrated) in a subsequent stage.

Note that in a case where the extension mode detection flag supplied from the packet header detection unit 81 does not indicate that it is the extension mode, that is, in a case where a packet having an existing packet structure is supplied, the interpretation unit 83 stops and does not perform the processes such as those described above.

In accordance with the extension mode detection flag supplied from the packet header detection unit 81, the selector 84 selectively supplies data to the unpacking unit 87 on the basis of the packet structure of the existing packet or the packet structure of the extended packet.

In accordance with the extension mode detection flag supplied from the packet header detection unit 81, the selector 85 selectively supplies data to the CRC calculation unit 86 on the basis of the packet structure of the existing packet or the packet structure of the extended packet.

The CRC calculation unit 86 calculates CRC of the packet header, the payload, the extended payload header, the optional extended payload header, or the optional extended payload footer selectively supplied via the selector 85. Then, in a case where a CRC error is detected, the CRC calculation unit 86 outputs a crc error detection signal indicating to that effect to the LSI (not illustrated) in the subsequent stage.

The unpacking unit 87 performs an unpacking process of extracting image data stored in a payload selectively supplied via the selector 84, and outputs the acquired image data to the LSI (not illustrated) in the subsequent stage.

The CCI master 88 takes the lead in communicating with the CCI slave 59 (FIG. 5) of the image sensor 21 on the basis of the CSI-2 standard.

Then, in the application processor 22, the parallel transmission setting is written to the register 73 similarly to the register 47 of the image sensor 21.

Then, the packet header detection unit 81, the lane merging unit 82, the interpretation unit 83, and the CRC calculation unit 86 refer to the parallel transmission setting of the register 73 and receive a packet transmitted in parallel from the image sensor 21.

For example, the packet header detection unit 81 detects a packet header transmitted in each lane, and the interpretation unit 83 interprets an MC and an LN transmitted in each lane. Furthermore, the CRC calculation unit 86 calculates CRC on the basis of a payload in each lane and detects a CRC error.

Moreover, in the application processor 22, the packet header detection unit 81 can detect an error notification packet (CSI-2 short packet illustrated in FIG. 4) transmitted from an error notification packet generation unit 89 of FIG. 7, which will be described later. Then, in a case where the packet header detection unit 81 detects the error notification packet, the packet header detection unit 81 outputs a flag indicating to that effect (error notification short packet reception flag) to the LSI (not illustrated) in the subsequent stage.

The application processor 22 is configured as described above, and can receive packets transmitted from the image sensor 21 by parallel transmission such as that described with reference to FIG. 3.

Furthermore, the application processor 22 can receive an extended packet transmitted from the image sensor 21, and can interpret setting information stored in the extended payload header, the optional extended payload header, and the optional extended payload footer to obtain image data. At that time, even if any of the lanes is disconnected, the CSI-2 receiver 32 can receive a payload of a packet transmitted by a normal lane among the plurality of lanes on the basis of the WC indicating the number of bytes of the payload in each lane.

Figure 7:
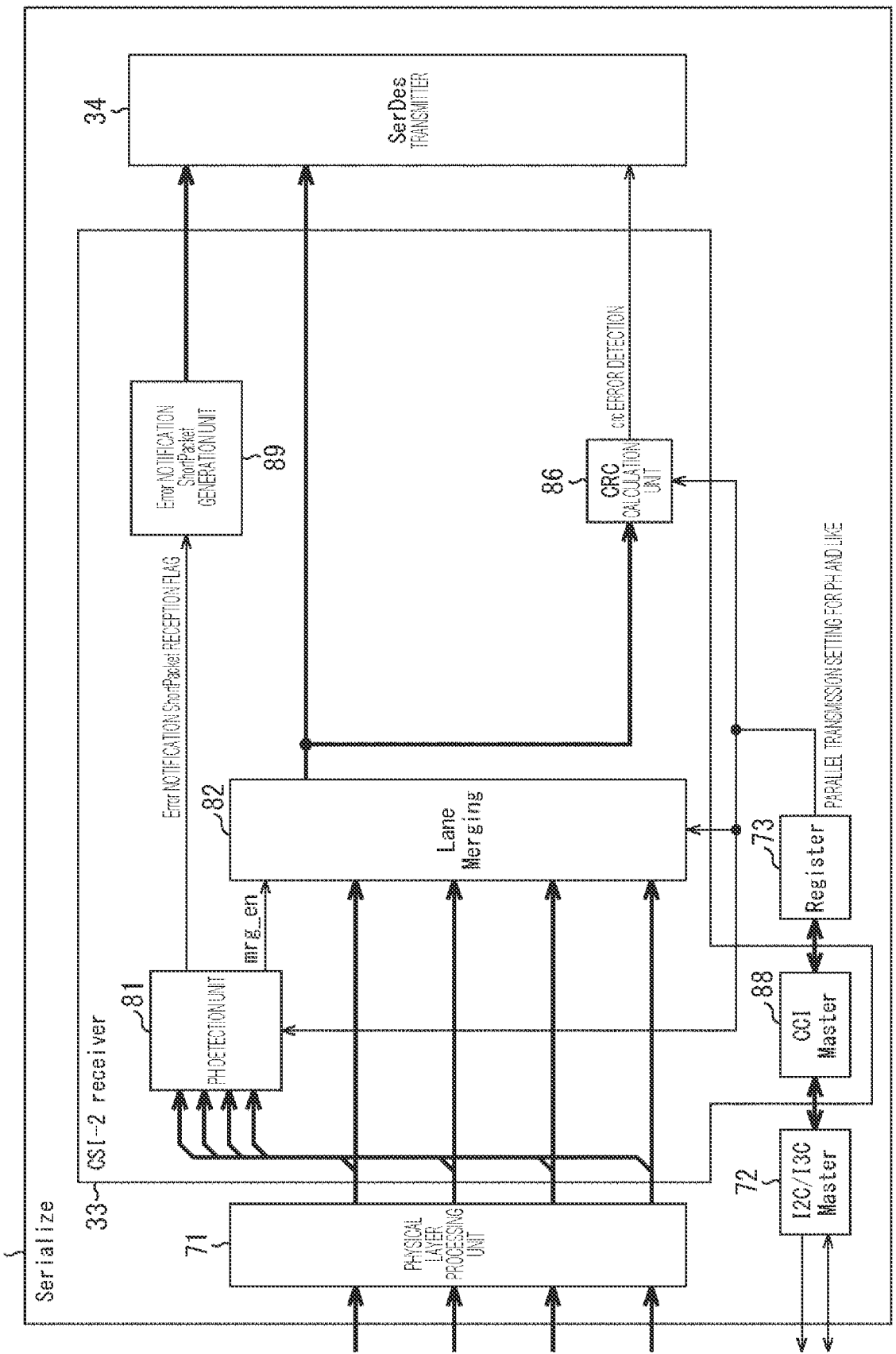
FIG. 7 is a block diagram illustrating an example configuration of a serializer.

FIG. 7 is a block diagram illustrating an example configuration of the serializer 23 including the CSI-2 receiver 33.

Note that in the serializer 23 illustrated in FIG. 7, regarding configurations common to those in the application processor 22 of FIG. 6, the same reference numerals are given thereto, and detailed descriptions thereof will be omitted. That is, the serializer 23 has a configuration common to that of the application processor 22 of FIG. 6 in the following point: the serializer 23 includes the physical layer processing unit 71, the I2C/I3C master 72, and the register 73, and the CSI-2 receiver 33 includes the packet header detection unit 81, the lane merging unit 82, the CRC calculation unit 86, and the CCI master 88.

On the other hand, the serializer 23 has a configuration different from that of the application processor 22 of FIG. 6 in the following point: the CSI-2 receiver 33 includes the error notification packet generation unit 89.

The error notification packet generation unit 89 generates and outputs the error notification packet illustrated in FIG. 4 in accordance with the flag (error notification short packet reception flag) supplied from the packet header detection unit 81.

As described above, in the communication system 11, the packet footer (CRC) is independently transmitted in each lane. This makes it possible to identify in which lane an error has occurred. Then, in a case where a lane is detected in which a certain number or larger number of occurrences of CRC error is identified, it is determined that the lane has high error frequency, and the application processor 22 sets the registry of the image sensor 21 so as not to use the lane, changes the mode, and then resumes communication.

Furthermore, in the communication system 11, the packet header is transmitted independently in each lane, and the definition of the WC is changed to the number of bytes to be sent in each lane, instead of the total length of the payload. Therefore, even if there is a lane in which there occurs a defect such as a disconnection, Sync loss, or a 2-bit error occurring in the packet header, reception can be continued in normal lanes other than the lane.

Furthermore, in the communication system 11, the MC is transmitted independently in each lane and incremented in each lane. Moreover, the lane number may be transmitted at the same time to clearly indicate via which lane the transmission has been performed. Note that the MC is cleared to zero at the head of a frame. Therefore, the CSI-2 receiver 33 can easily detect a disconnection and Sync loss only by a link layer (CSI-2) without changing a PHY layer (D-PHY or C-PHY). Furthermore, the CSI-2 receiver 33 can determine a disconnection or Sync loss only by the lack of the MC in the link layer.

Moreover, in the communication system 11, in a case where there occurs a serious error (Sync loss, disconnection, error of 2 bits or more in PH) which prevents data from being output from the SerDes transmitter 34, error information can be transmitted to the application processor 22 in a subsequent stage. At that time, the error information can be transmitted at high speed by transmitting the error notification packet (CSI-2 short packet illustrated in FIG. 4) in accordance with a CSI-2 format. Therefore, the application processor 22 in the subsequent stage can immediately know the error in the SerDes transmitter 34. Then, in a case where the application processor 22 receives the error information in a specific lane a predetermined number of times or more, the application processor 22 can instruct the image sensor 21 and the SerDes transmitter 34 to stop using the lane.

As described above, in the communication system 11, the application processor 22 side can quickly identify in which lane the disconnection, the SYNC loss, or the frequent occurrence of the error occurs. This makes it possible for the application processor 22 to detour around a specific lane and to perform continuous communication using normal lanes only, and therefore reliability can be improved and securer communication such as that for on-board items can be supported.

<Communication Process>

A communication process performed by the image sensor 21 and the application processor 22 will be described with reference to FIGS. 8 to 11.

Figure 8:
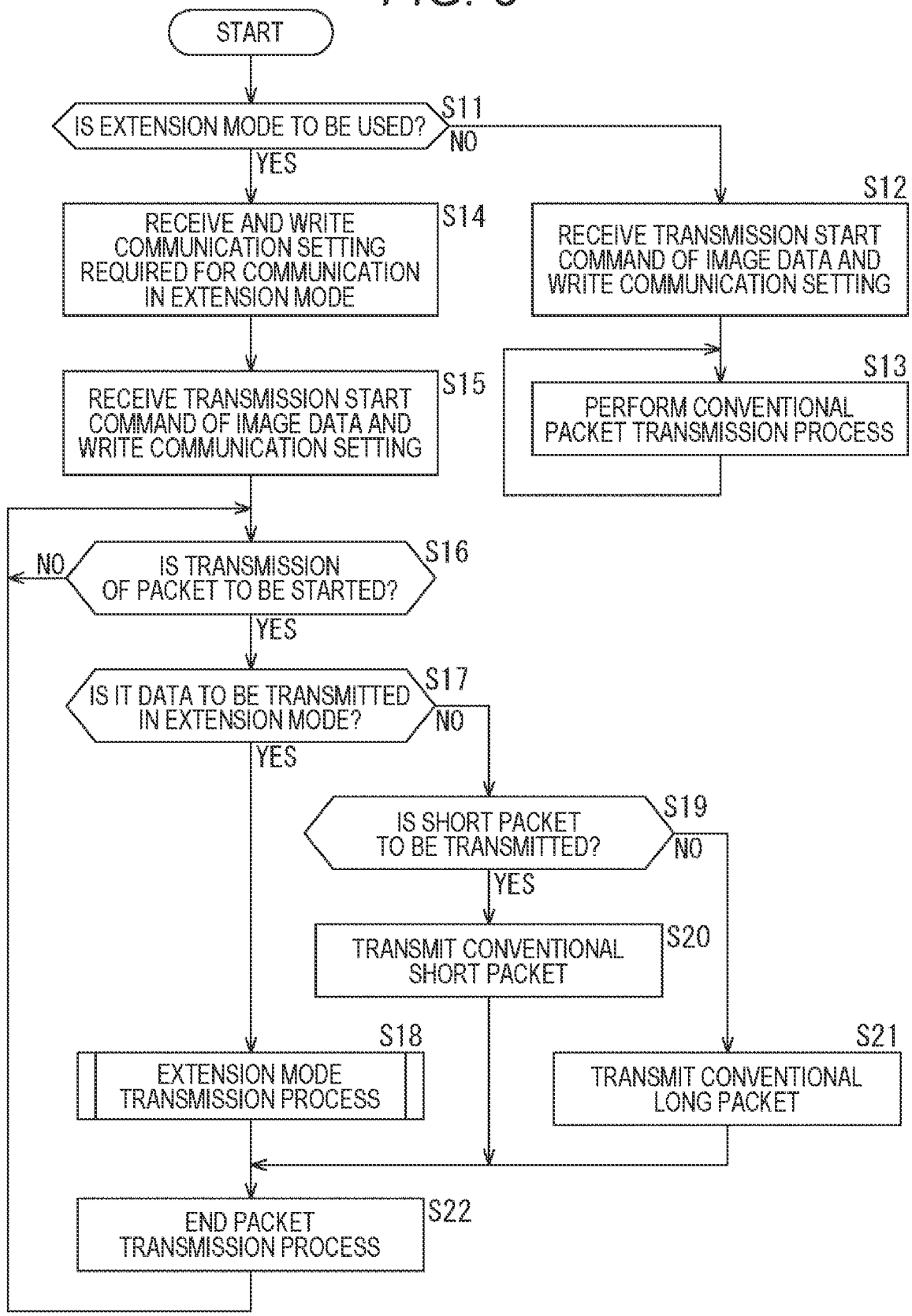
FIG. 8 is a flowchart explaining a process in which the image sensor transmits a packet.

FIG. 8 is a flowchart explaining a process in which the image sensor 21 transmits a packet.

For example, when the image sensor 21 is connected to the application processor 22 via the bus 26, the process is started. In step S11, the controller 60 determines whether or not to use the extension mode when starting communication with the application processor 22. For example, the controller 60 checks the extension mode setting stored in the register 47, and determines to use the extension mode in a case where an extension mode setting indicating the use of the extension mode is written by the application processor 22.

If the controller 60 determines in step S11 not to use the extension mode, the process proceeds to step S12.

In step S12, the I2C/I3C slave 46 receives a transmission start command of image data transmitted from the application processor 22 (in step S54 of FIG. 10 as described later). Moreover, the I2C/I3C slave 46 receives a communication setting in conformity with the CSI-2 standard transmitted together with the transmission start command, and writes the communication setting to the register 47 via the CCI slave 59.

In step S13, the image sensor 21 executes a conventional packet transmission process of transmitting a packet having a packet structure in conformity with the existing CSI-2 standard to the application processor 22 on the basis of the communication setting stored in the register 47.

On the other hand, if the controller 60 determines in step S11 to use the extension mode, the process proceeds to step S14.

In step S14, the I2C/I3C slave 46 receives a fixed communication setting (for example, a copy of PH/PF for each lane during GLD) required for communication in the extension mode and writes the fixed communication setting to the register 47 via the CCI slave 59.

In step S15, the I2C/I3C slave 46 receives a transmission start command of image data transmitted from the application processor 22 (in step S57 of FIG. 10 as described later). Moreover, the I2C/I3C slave 46 receives a communication setting in conformity with the CSI-2 standard transmitted together with the transmission start command, and writes the communication setting to the register 47 via the CCI slave 59.

In step S16, the controller 60 determines whether or not to start transmitting a packet, and stands by without starting a process until it is determined to start transmitting the packet.

Then, if it is determined in step S16 to start transmitting the packet, the process proceeds to step S17, and the controller 60 determines whether or not it is data to be transmitted in the extension mode. Here, depending on the content of the data to be transmitted, the controller 60 determines that it is data to be transmitted in the extension mode, for example, in a case where it is data to be transmitted in a predetermined use case.

If the controller 60 determines in step S17 that it is data to be transmitted in the extension mode, the process proceeds to step S18, and the extension mode transmission process (see FIG. 9) of transmitting an extended packet supporting the extension mode is performed.

On the other hand, if the controller 60 determines in step S17 that it is data not to be transmitted in the extension mode, the process proceeds to step S19.

In step S19, the controller 60 determines whether or not to transmit a short packet. For example, the controller 60 determines to transmit the short packet at start of frame and end of frame.

If the controller 60 determines in step S19 to transmit the short packet, the process proceeds to step S20. In step S20, the packet header generation unit 52 generates a packet header and transmits a short packet having a conventional packet structure to the application processor 22.

On the other hand, if the controller 60 determines in step S19 not to transmit the short packet (that is, to transmit a long packet), the process proceeds to step S21. In step S21, the packing unit 51 stores image data in a payload, and the CRC calculation unit 57 obtains the CRC, and thereby a long packet having a conventional packet structure is generated and transmitted to the application processor 22.

After the process of step S18, step S20, or step S21, the process proceeds to step S22, and the controller 60 ends the packet transmission process. Thereafter, the process returns to step S16, and afterward the process of similarly transmitting a packet is repeatedly performed for the next packet.

Figure 9:
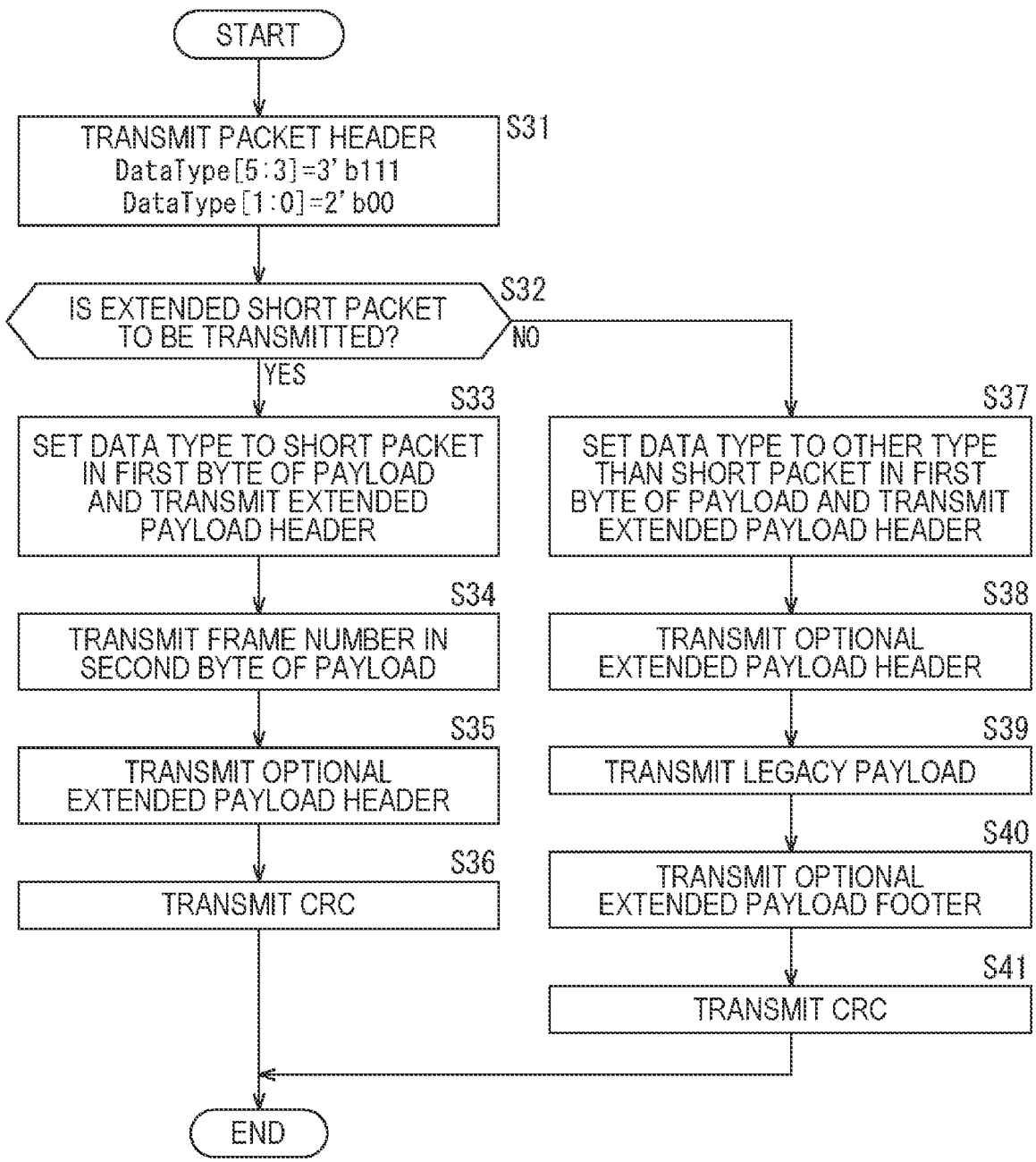
FIG. 9 is a flowchart explaining an extension mode transmission process.

FIG. 9 is a flowchart explaining the extension mode transmission process performed in the process of step S18 of FIG. 8.

In step S31, the packet header generation unit 52 generates a packet header storing VC, data type, WC, and the like, and transmits the packet header to the application processor 22. At that time, the packet header generation unit 52 writes the extension mode setting information (DataType [5:3]= 3'b111) indicating that it is the extension mode and the extension type setting information (DataType [1:0]=2'b00) identifying that the mode setting of the extension mode is extension mode 0, to the data type of the packet header. Furthermore, the packet header is transmitted independently in each lane.

In step S32, the application processor 22 determines whether or not to transmit an extended short packet. For example, the controller 60 determines to transmit the extended short packet at start of frame and end of frame.

If the application processor 22 determines in step S32 to transmit the extended short packet, the process proceeds to step S33.

In step S33, the payload header generation unit 53 transmits an extended payload header in which data type (DataType [7:0]) is set to a short packet in a first byte of the payload. At that time, the payload header generation unit 53 makes various settings (for example, OePH [7:0], OePF [3:0], and the like) stored in the extended payload header.

In step S34, the payload header generation unit 53 stores and transmits frame number (FN) in a second byte of the payload.

In step S35, the payload header generation unit 53 generates and transmits an optional extended payload header (OePH) in accordance with the setting (OePH [7:0]) made in step S33.

In step S36, the CRC calculation unit 57 obtains CRC and transmits the CRC as a packet footer. At that time, the packet footer is transmitted independently in each lane.

On the other hand, if the application processor 22 determines in step S32 not to transmit the extended short packet (that is, to transmit a long packet), the process proceeds to step S37.

In step S37, the payload header generation unit 53 transmits an extended payload header in which the data type (DataType [7:0]) is set to other type than a short packet in the first byte of the payload. At that time, the payload header generation unit 53 makes various settings (for example, OePH [7:0], OePF [3:0], and the like) stored in the extended payload header.

In step S38, the payload header generation unit 53 generates and transmits an optional extended payload header (OePH) in accordance with the setting (OePH [7:0]) made in step S37.

In step S39, the packing unit 51 packs image data supplied from the image signal processor 43, generates and transmits a legacy payload.

In step S40, the payload footer generation unit 54 generates and transmits an optional extended payload header (OePH) in accordance with the setting (OePF [3:0]) made in step S37.

In step S41, the CRC calculation unit 57 obtains CRC and transmits the CRC as a packet footer. At that time, the packet footer is transmitted independently in each lane.

Then, after the process of step S36 or S41, the extension mode transmission process is ended.

As described above, the image sensor 21 can generate and transmit an extended short packet or an extended long packet.

Figure 10:
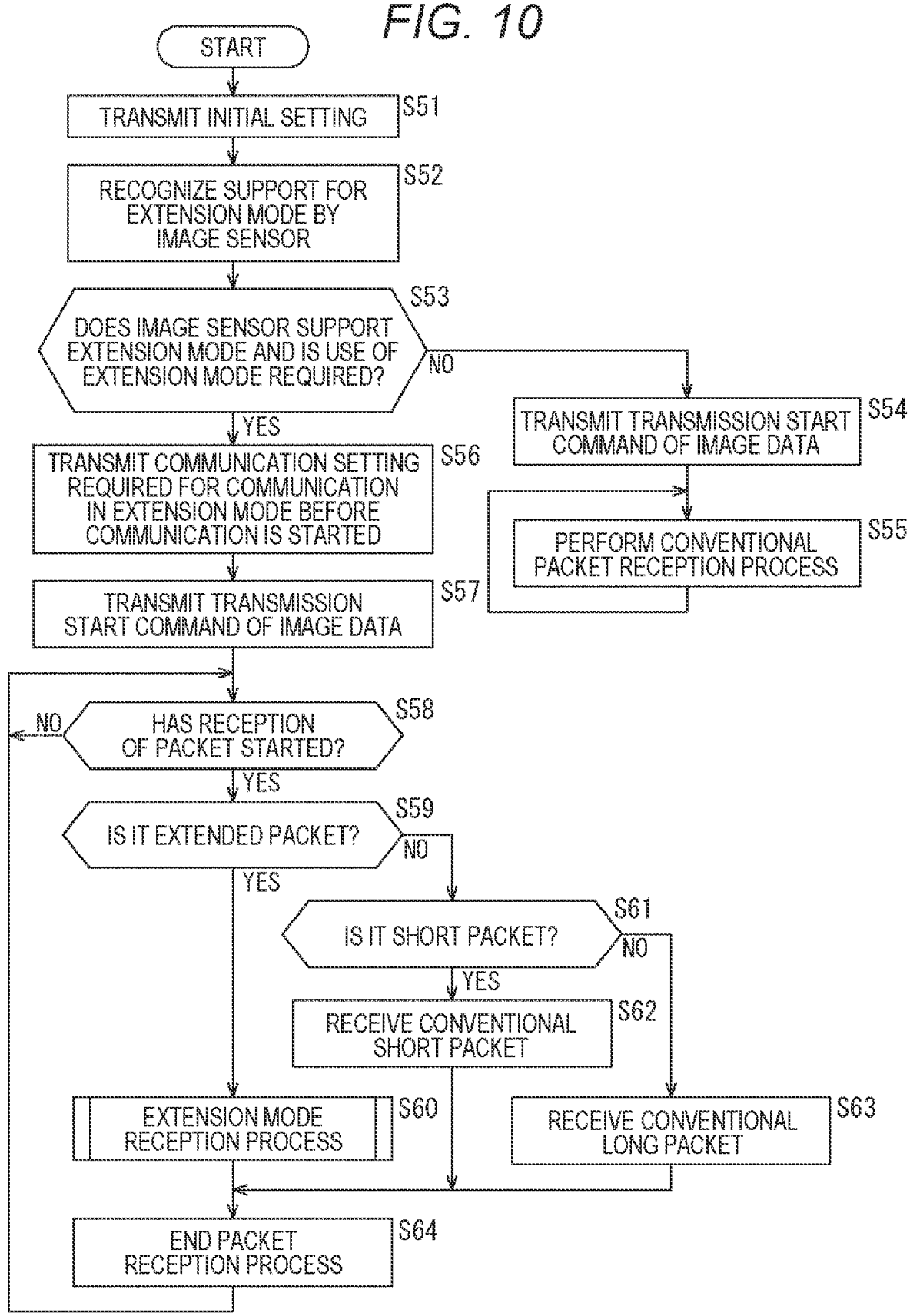
FIG. 10 is a flowchart explaining a process in which the application processor receives a packet.

FIG. 10 is a flowchart explaining a process in which the application processor 22 receives a packet.

For example, when the image sensor 21 is connected to the application processor 22 via the bus 26, the process is started. In step S51, an initial setting of the image sensor 21 (for example, which of C-PHY or D-PHY is used as a physical layer) is written to register 73 and transmitted by the I2C/I3C master 72 to the image sensor 21 via the CCI master 88. Therefore, the initial setting is written to the register 47 of the image sensor 21.

In step S52, it is recognized whether or not the image sensor 21 supports the extension mode. For example, whether or not the image sensor 21 supports the extension mode can be recognized by acquiring a set value (for example, extended PH/PF-supporting capability) stored in the register 47 of the image sensor 21 by the I2C/I3C master 72. Alternatively, it is possible to recognize in advance whether or not the image sensor 21 supports the extension mode on the basis of manual input or the like, for example.

In step S53, it is determined whether or not the image sensor 21 supports the extension mode and whether or not the application executed by the application processor 22 requires the use of the extension mode.

If it is determined in step S53 that the image sensor 21 does not support the extension mode or that the use of the extension mode is not required, the process proceeds to step S54.

In step S54, the I2C/I3C master 72 transmits a transmission start command of image data to the image sensor 21. At that time, a communication setting in conformity with the CSI-2 standard is also transmitted.

In step S55, the application processor 22 performs a conventional packet reception process of receiving a packet having a packet structure in conformity with the existing CSI-2 standard on the basis of the communication setting transmitted in step S54.

On the other hand, if it is determined in step S53 that the image sensor 21 supports the extension mode and that the application executed by the application processor 22 requires the use of the extension mode, the process proceeds to step S56.

In step S56, the I2C/I3C master 72 transmits a fixed communication setting required for communication in the extension mode before the communication in the extension mode is started. Therefore, the fixed communication setting is written to the register 47 of the image sensor 21 (step S14 of FIG. 8).

In step S57, the I2C/I3C master 72 transmits a transmission start command of image data to the image sensor 21. At that time, a communication setting in conformity with the CSI-2 standard is also transmitted.

In step S58, the packet header detection unit 81 determines whether or not reception of the packet has started by checking data supplied from the physical layer processing unit 71, and stands by without staring a process until it is determined that the reception of the packet has started. For example, in a case where a packet header is detected from the data supplied from the physical layer processing unit 71, the packet header detection unit 81 determines that the reception of the packet has started. At that time, the packet header is transmitted independently in each lane.

If the packet header detection unit 81 determines in step S58 that the reception of the packet has started, the process proceeds to step S59.

In step S59, the packet header detection unit 81 checks the data type of the packet header detected in step S58, and determines whether or not the packet of which reception has started is an extended packet supporting the extension mode. For example, in a case where the extension mode setting information indicates that it is the extension mode in the data type of the packet header (DataType [5:3]=3'b111), the packet header detection unit 81 determines that the packet of which reception has started is an extended packet.

If the packet header detection unit 81 determines in step S59 that the packet of which reception has started is an extended packet, the process proceeds to step S60, and an extension mode reception process (see FIG. 11) of receiving an extended packet is performed.

On the other hand, if the packet header detection unit 81 determines in step S59 that the packet of which reception has started is not an extended packet, the process proceeds to step S61.

In step S61, the packet header detection unit 81 checks the data type (DataType [5:0]) of the packet header detected in step S58, and determines whether or not the packet of which reception has started is a short packet.

If the packet header detection unit 81 determines in step S61 that the packet of which reception has started is a short packet, the process proceeds to step S62. In step S62, the packet header detection unit 81 receives a short packet having a conventional packet structure transmitted from the image sensor 21.

On the other hand, if the packet header detection unit 81 determines in step S61 that the packet of which reception has started is not a short packet (that is, reception of a long packet has started), the process proceeds to step S63. In step S63, the unpacking unit 87 receives a payload of the long packet having a conventional packet structure transmitted from the image sensor 21 and extracts image data, and the CRC calculation unit 86 receives WC+first byte transmitted following the packet header as CRC.

After the process of step S60, step S62, or step S63, the process proceeds to step S64, and the packet reception process is ended. Thereafter, the process returns to step S58, and afterward the process of similarly receiving a packet is repeatedly performed for the next packet.

Figure 11:
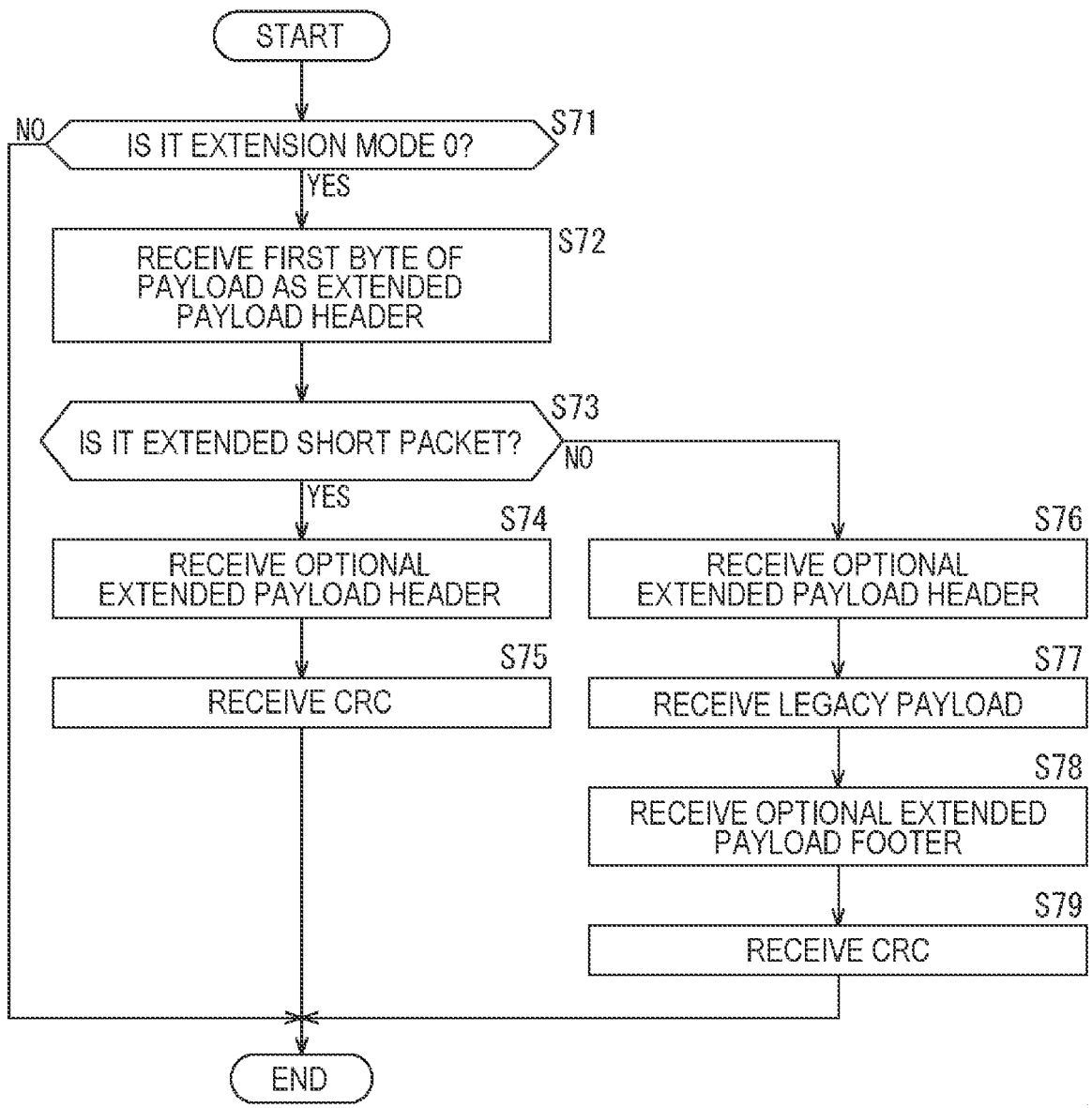
FIG. 11 is a flowchart explaining an extension mode reception process.

FIG. 11 is a flowchart explaining the extension mode reception process performed in the process of step S60 of FIG. 10.

In step S71, the packet header detection unit 81 determines whether or not the mode setting of the extension mode is extension mode 0. For example, in a case where the extension type setting information indicates that it is extension mode 0 in the data type of the packet header (DataType [1:0]=2'b00), the packet header detection unit 81 determines that the mode setting of the extension mode is extension mode 0.

If the packet header detection unit 81 determines in step S71 that the mode setting of the extension mode is extension mode 0, the process proceeds to step S72. In step S72, the interpretation unit 83 receives a first byte of the payload as the extended payload header.

In step S73, the interpretation unit 83 checks the data type (DataType [7:0]) of the extended payload header received in step S72, and determines whether or not the packet of which reception has started is an extended short packet.

If the interpretation unit 83 determines in step S73 that the packet is the extended short packet, the process proceeds to step S74. In step S74, the interpretation unit 83 receives an optional extended payload header in accordance with the setting (OePH [7:0]) stored in the extended payload header received in step S72.

In step S75, the CRC calculation unit 86 receives the WC+first byte transmitted following the optional extended payload header as CRC. At that time, the CRC, which is a packet footer, is transmitted independently in each lane.

On the other hand, if the interpretation unit 83 determines in step S73 that the packet is not an extended short packet (that is, reception of an extended long packet has started), the process proceeds to step S76. In step S76, the interpretation unit 83 receives an optional extended payload header in accordance with the setting (OePH [7:0]) stored in the extended payload header received in step S72.

In step S77, the unpacking unit 87 receives the legacy payload of the extended long packet transmitted from the image sensor 21 and extracts image data.

In step S78, the interpretation unit 83 receives an optional extended payload footer in accordance with the setting (OePF [3:0]) stored in the extended payload header received in step S72.

In step S79, the CRC calculation unit 86 receives the WC+first byte transmitted following the optional extended payload footer as CRC. At that time, the CRC, which is a packet footer, is transmitted independently in each lane.

Then, if it is determined in step S71 that the mode setting of the extension mode is not extension mode 0, the extension mode reception process is ended after the process of step S75 or the process of step S79.

As described above, the application processor 22 can receive the extended short packet or the extended long packet and acquire the data.

Figure 12:
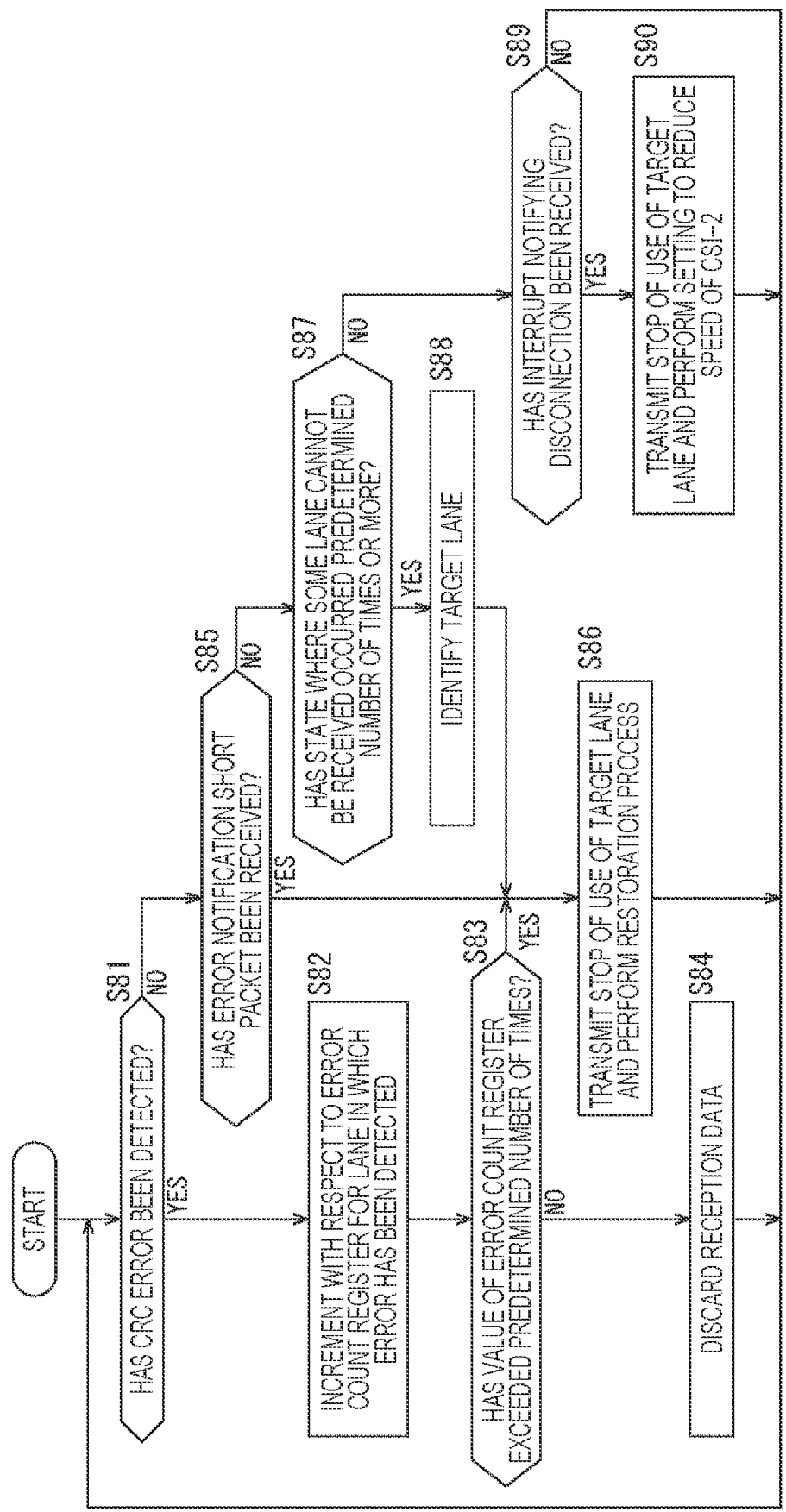
FIG. 12 is a flowchart explaining an error process.

FIG. 12 is a flowchart explaining an error process performed by the error processing unit 74 of FIG. 6.

In step S81, the error processing unit 74 determines whether or not a CRC error has been detected, that is, whether or not a crc error detection signal output from the CRC calculation unit 86 indicates that a CRC error has been detected.

If the error processing unit 74 determines in step S81 that the CRC error has been detected, the process proceeds to step S82. In step S82, the error processing unit 74 increments (+1) with respect to an error count register for a lane in which the CRC error has been detected.

In step S83, the error processing unit 74 determines whether or not a value of the error count register incremented in step S82 has exceeded a predetermined number of times.

If the error processing unit 74 determines in step S83 that the value of the error count register has not exceeded the predetermined number of times, the process proceeds to step S84. In step S84, the application processor 22 discards reception data in which the CRC error has been detected, then the process returns to step S81, and afterward a similar process is repeatedly performed.

On the other hand, if the error processing unit 74 determines in step S81 that the CRC error has not been detected, the process proceeds to step S85. In step S85, the error processing unit 74 determines whether or not an error notification short packet has been received. For example, the error processing unit 74 can perform the determination in accordance with the error notification short packet reception flag output from the packet header detection unit 81.

If the error processing unit 74 determines in step S85 that the error notification short packet has been received, the process proceeds to step S86.

In step S86, the error processing unit 74 stops using a target lane for which it is indicated in the error notification short packet that an error has occurred. Then, the error processing unit 74 transmits a notification to the effect that the use of the target lane has been stopped from the CCI master 88 to the image sensor 21, the serializer 23, and the deserializer 24 via the I2C/I3C master 72, to cause a restoration process of the target lane to be performed.

That is, in this case, since it has been possible to receive the error notification short packet, it can be recognized that the bus 26 and the bus 25-2 are normal and the bus 25-1 is disconnected. However, in a case where both the bus 25-1 and the bus 25-2 do not have the same number of lanes, the communication speeds cannot be balanced. Therefore, when a disconnection is detected in the bus 25-1, even if it is a lane usable in the bus 25-2, a process is performed which makes the numbers of lanes in the bus 25-1 and the bus 25-2 the same.

Thereafter, the process returns to step S81, and afterward a similar process is repeatedly performed.

On the other hand, if the error processing unit 74 determines in step S85 that the error notification short packet has not been received, the process proceeds to step S87. In step S87, the error processing unit 74 determines whether or not a state where some lane cannot be received has occurred a predetermined number of times or more.

If the error processing unit 74 determines in step S87 that the state where some lane cannot be received has occurred the predetermined number of times or more, the process proceeds to step S88.

In step S88, the error processing unit 74 identifies the target lane in which the error has occurred on the basis of the message count for GLD (MC) and the lane number (LN) transmitted independently in each lane by the interpretation unit 83 interpreting and outputting the setting information stored in the optional extended payload header. After the process of step S88, the process proceeds to step S86, and afterward a process similar to that described above is performed.

That is, in this case, in view of the fact that the MC is successively missing, it can be recognized that the bus 25-1 and the bus 26 are normal, and the bus 25-2 is disconnected. However, in a case where both the bus 25-1 and the bus 25-2 do not have the same number of lanes, the communication speeds cannot be balanced. Therefore, the disconnected lane of the bus 25-2 is identified, and the use of a corresponding lane of the bus 25-1 is prohibited.

On the other hand, if the error processing unit 74 determines in step S87 that the state where some lane cannot be received has not occurred the predetermined number of times or more, the process proceeds to step S89.

In step S89, the error processing unit 74 determines whether or not an interrupt notifying the disconnection has been received.

Here, for example, in a case where the deserializer 24 detects the disconnection of the bus 26, the deserializer 24 can notify the error processing unit 74 that the disconnection of the bus 26 has been detected by using one of the HS-GPIO signal lines of the bus 25-2 as a disconnection error detection interrupt line. Accordingly, the error processing unit 74 can determine in step S87 whether or not the interrupt notifying the disconnection has been received by using the HS-GPIO signal line as the disconnection error detection interrupt line. Furthermore, in addition thereto, the disconnection of the bus 26 among the detected errors may be detected by using one of the HS-GPIO signal lines of the bus 25-2 as an error detection interrupt Line, and reading an internal register of the deserializer 24 via the I2C/I3C master 72 regarding specific details of the errors.

If the error processing unit 74 determines in step S89 that the interrupt notifying the disconnection has been received, the process proceeds to step S90. In step S90, the error processing unit 74 sets the CCI master 88 so as to stop using the target lane in which the disconnection has occurred and reduce the communication speed of the communication by the CSI-2.

That is, in this case, the disconnection has occurred in the bus 26, and in a case where the bus 26 includes a plurality of lanes, the use of the target lane in which the disconnection has occurred is prohibited and continuous communication is performed. Then, in line with the decrease in the bandwidth of the bus 26, the communication speeds of the buses 25-1 and 25-2 are reduced in order to maintain the balance of the communication speeds.

After the process of step S90, or if it is determined in step S89 that the interrupt notifying the disconnection has not been received, the process returns to step S81, and afterward a similar process is repeatedly performed.

As described above, the error processing unit 74 can quickly identify a lane in which many CRC errors are detected, a disconnected lane notified by the error notification short packet, a lane in which unsuccessful reception has frequently occurred, and a lane notified of an interrupt notifying disconnection by receiving the interrupt, and the like. Therefore, the application processor 22 can stop using the lane identified by the error processing unit 74 and perform continuous communication using normal lanes only. Accordingly, it is possible for the communication system 11 to improve the reliability and to support securer communication such as that for on-board items.

<Second Example Configuration of Communication System>

An example configuration of a second embodiment of a communication system to which the present technology is applied will be described with reference to FIGS. 13 to 15.

Figure 13:
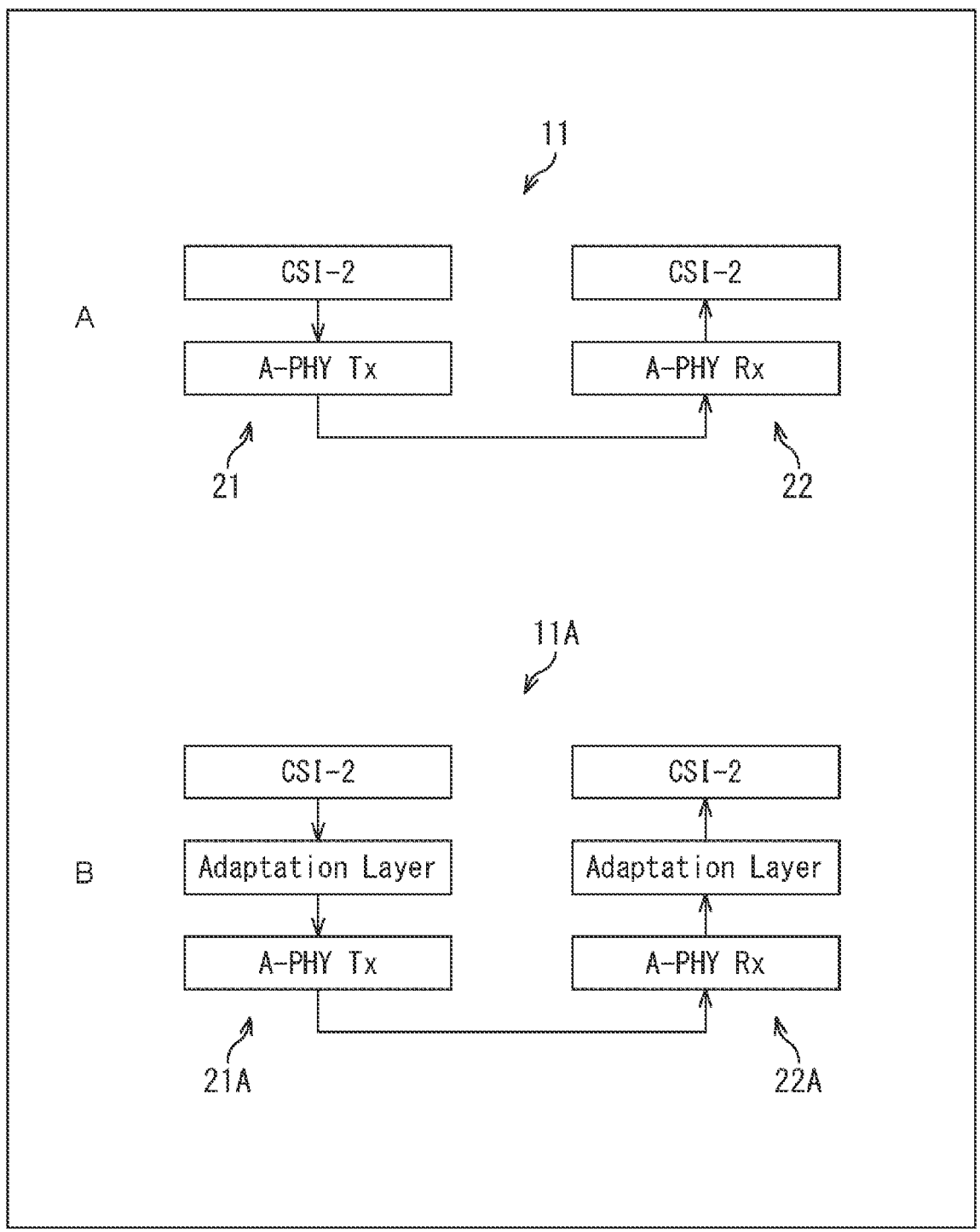
FIG. 13 is a block diagram illustrating an example configuration of a second embodiment of a communication system to which the present technology is applied.

With FIG. 13, the communication system 11 according to the first embodiment and a communication system 11A according to the second embodiment will be compared and described.

For example, as illustrated in A of FIG. 13, the communication system 11 has a configuration in which the CSI-2 transmitter is connected to a physical layer (A-PHY Tx) on an image sensor 21 side, and a physical layer (A-PHY Rx) is connected to the CSI-2 receiver on an application processor 22 side.

Accordingly, it is necessary in the communication system 11 to change a circuit configuration with respect to the existing CSI-2 receiver and CSI-2 transmitter.

On the other hand, as illustrated in B of FIG. 13, the communication system 11A has a configuration in which the CSI-2 transmitter and the physical layer (A-PHY Tx) are connected via an adaptation layer on the image sensor 21 side, and the physical layer (A-PHY Rx) and the CSI-2 receiver are connected via an adaptation layer on the application processor 22 side.

By providing the adaptation layers as described above, circuit configurations of the existing CSI-2 receiver and CSI-2 transmitter can be directly used in the communication system 11A. That is, it is possible to avoid changing the circuit configurations of the existing CSI-2 receiver and CSI-2 transmitter by providing adaptation layers having functions necessary for parallel transmission such as that described with reference to FIG. 3 described above.

Figure 14:
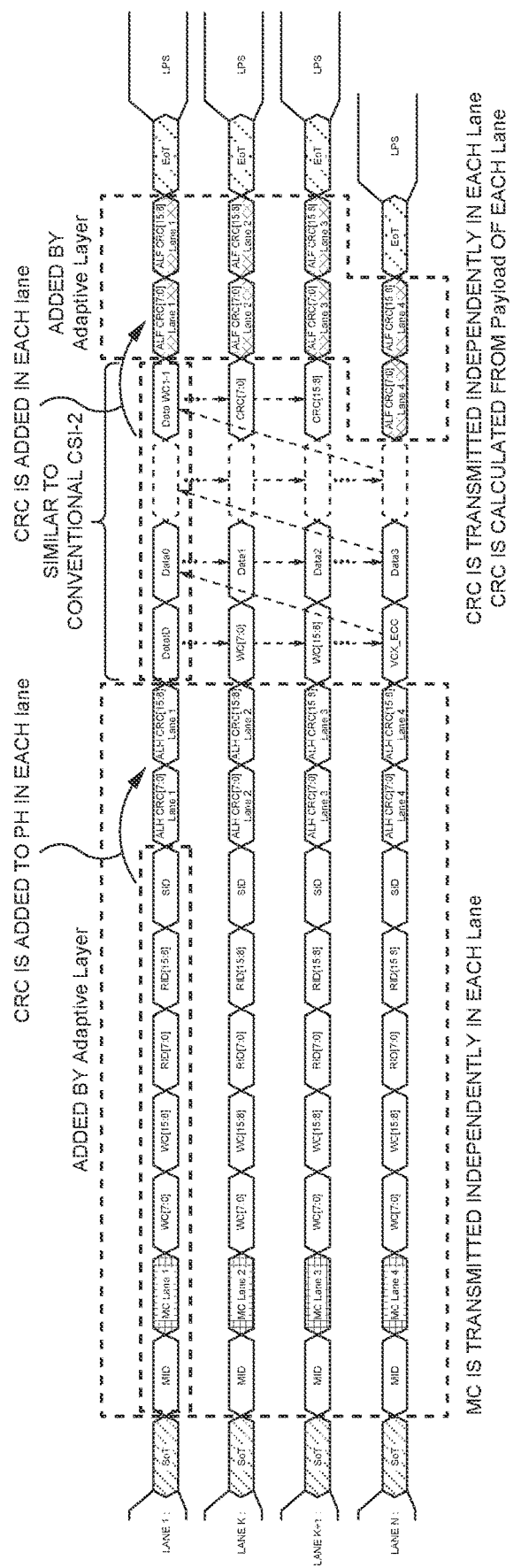
FIG. 14 is a diagram illustrating a second example configuration of a packet structure of an extended packet.

That is, as illustrated in FIG. 14, processes of transmitting a packet header and an MC independently in each lane, calculating CRC from a payload in each lane and transmitting the CRC independently in each lane, and the like can be additionally performed by adaptation layers. Furthermore, a payload similar to the conventional CSI-2 can be processed in the existing CSI-2 receiver and CSI-2 transmitter.

Figure 15:
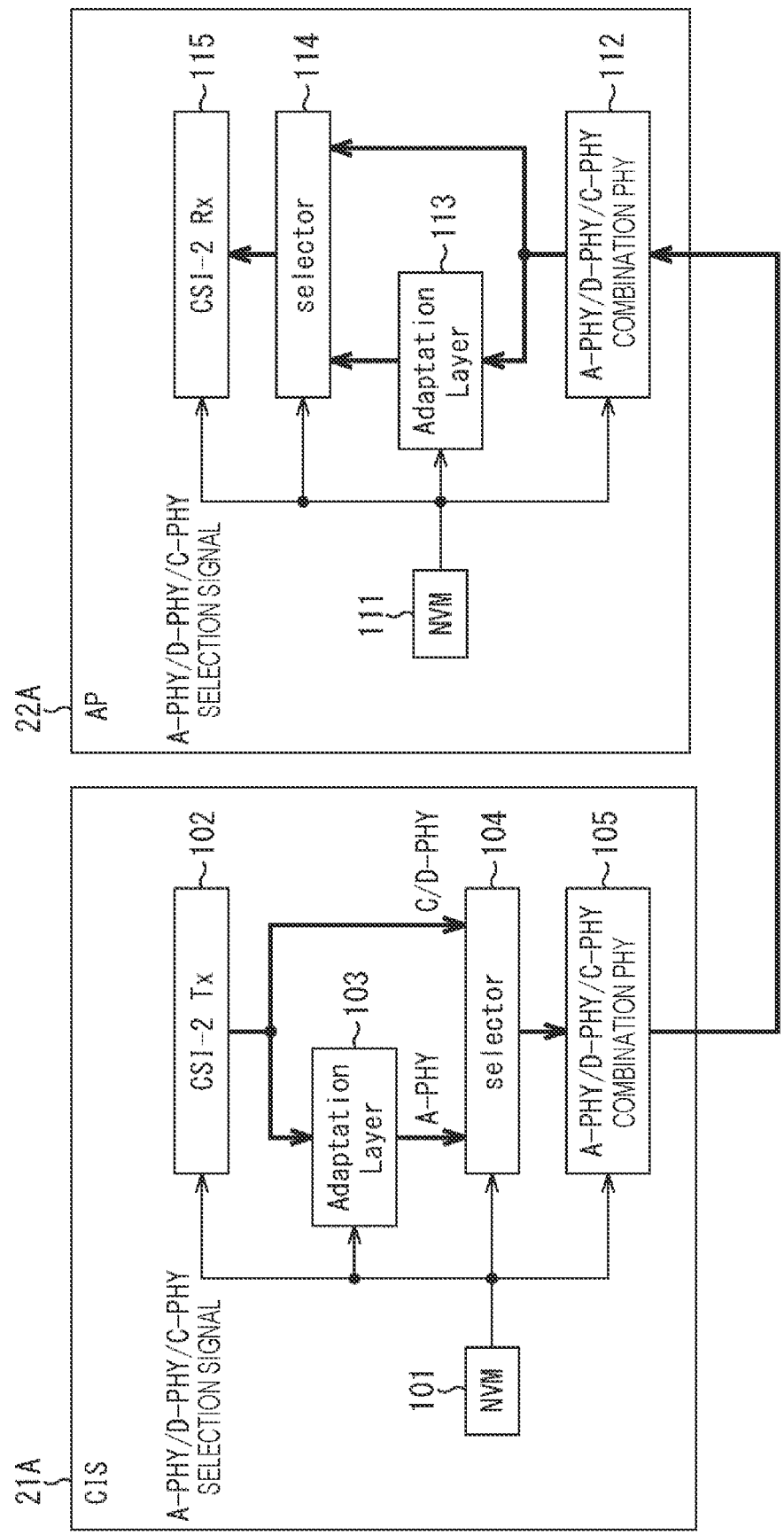
FIG. 15 is a diagram illustrating a schematic example configuration of each of an image sensor and an application processor.

FIG. 15 illustrates a schematic example configuration of each of an image sensor 21A and an application processor 22A constituting the communication system 11A.

As illustrated in FIG. 15, the image sensor 21A includes a non-volatile memory 101, a CSI-2 transmitter 102, an adaptation layer 103, a selector 104, and a physical layer processing unit 105. The application processor 22A includes a non-volatile memory 111, a physical layer processing unit 112, an adaptation layer 113, a selector 114, and a CSI-2 transmitter 115.

For example, the physical layer processing unit 105 and the physical layer processing unit 112 can selectively switch any of the physical layers of A-PHY, D-PHY, and C-PHY. Then, a selection signal for selecting any of the physical layers is supplied from the non-volatile memory 101 to each block of the image sensor 21A, and is supplied from the non-volatile memory 111 to each block of the application processor 22A.

Accordingly, for example, in a case where the selection signal indicates that A-PHY is selected, in the image sensor 21A, the CSI-2 transmitter 102 supplies a packet to the adaptation layer 103, and the adaptation layer 103 generates a packet header and an MC for each lane, or calculates CRC from a payload in each lane. Then, the selector 104 supplies an output from the adaptation layer 103 to the physical layer processing unit 105, and a process using the A-PHY as the physical layer is performed in the physical layer processing unit 105.

Then, in the application processor 22A, the process using the A-PHY as the physical layer is performed in the physical layer processing unit 112, a received packet is supplied to the adaptation layer 113, and a process is performed on an object transmitted in each lane. Then, the selector 114 supplies an output from the adaptation layer 113 to the CSI-2 transmitter 115, and a process is performed on a packet in the CSI-2 transmitter 115.

On the other hand, in a case where the selection signal indicates that D-PHY or C-PHY is selected, in the image sensor 21A, the CSI-2 transmitter 102 supplies a packet to the physical layer processing unit 105 via the selector 104, and a process using the D-PHY or the C-PHY as the physical layer is performed in the physical layer processing unit 105.

Then, in the application processor 22A, the process using the D-PHY or the C-PHYY as the physical layer is performed in the physical layer processing unit 112, and a received packet is supplied to the CSI-2 transmitter 115 via the selector 114.

<Example Configuration of Computer>

Figure 16:
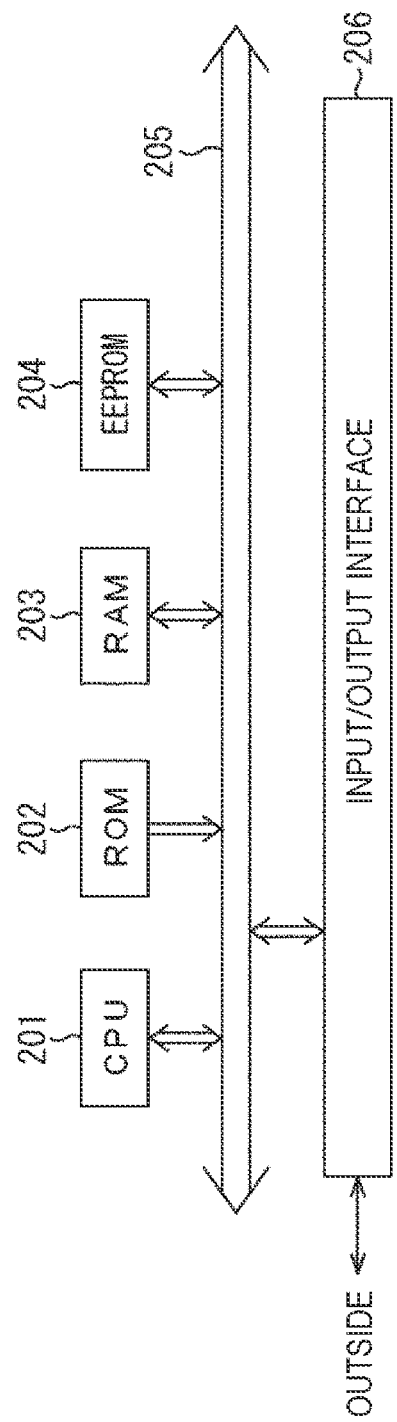
FIG. 16 is a block diagram illustrating an example configuration of an embodiment of a computer to which the present technology is applied.

FIG. 16 is a block diagram illustrating an example configuration of hardware of a computer caused to execute the series of processes described above by a program.

In the computer, a central processing unit (CPU) 201, a read only memory (ROM) 202, a random access memory (RAM) 203, and an electronically erasable programmable read only memory (EEPROM) 204 are connected to one another by a bus 205. An input/output interface 206 is further connected to the bus 205, and the input/output interface 206 is connected to the outside.

In the computer with the above configuration, the CPU 201 loads, for example, programs stored in the ROM 202 and the EEPROM 204 to the RAM 203 via the bus 205 to execute the programs, and thereby the above-described series of processes is performed. Furthermore, such a program executed by the computer (CPU 201) can be written in advance in the ROM 202, or can be installed or updated in the EEPROM 204 from the outside via the input/output interface 206.

Here, the processes performed herein by the computer in accordance with the program do not necessarily have to be performed in time series in the order described as the flowcharts. That is, in the processes performed by the computer in accordance with the program, a process executed in parallel or individually (for example, a parallel process or an object-based process) is also included.

Furthermore, the program may be processed by one computer (processor) or may be processed by a plurality of computers in a distributed manner. Moreover, the program may be transferred to a distant computer and executed.

Moreover, a system as used herein means a collection of multiple components (such as an apparatus and a module (part)), irrespective of whether or not all components are included in the same housing. Accordingly, both of multiple apparatuses accommodated in separate housings and connected through a network, and one apparatus in which multiple modules are accommodated in one housing are systems.

Furthermore, for example, the configuration described in the above as one apparatus (or processing unit) may be divided and configured as multiple apparatuses (or processing units). On the contrary, the configuration described in the above as multiple apparatuses (or processing units) may be integrated and configured as one apparatus (or processing unit). Furthermore, as a matter of course, a configuration other than those described above may be added to the configuration of each apparatus (or each processing unit). Moreover, as long as a configuration or an operation of the system as a whole is substantially the same, a part of a configuration of an apparatus (or processing unit) may be included in a configuration of another apparatus (or another processing unit).

Furthermore, for example, the present technology may have a cloud computing configuration in which multiple apparatuses share one function through a network, and jointly perform a process.

Furthermore, for example, the above-described program can be executed in any apparatus. In that case, it is enough for the apparatus to have necessary functions (functional blocks and the like) so as to be able to obtain necessary information.

Furthermore, for example, each step described with the above flowcharts can be executed by one apparatus, and in addition, can be shared and executed by multiple apparatuses. Moreover, in a case where multiple processes are included in one step, the multiple processes included in the one step can be executed by one apparatus, and in addition, can be shared and executed by multiple apparatuses. In other words, multiple processes included in one step can be also executed as processes of multiple steps. On the contrary, processes described as multiple steps can be collectively executed as one step.

Note that regarding the program executed by the computer, processes of a step of describing the program may be executed in time series in the order described herein, or may be executed in parallel or individually at a necessary timing, for example, when a call is made. That is, as long as there occurs no contradiction, processes of respective steps may be executed in an order different from the above-described order. Moreover, the processes of the step of describing the program may be executed in parallel with a process of another program, or may be executed in combination with a process of another program.

Note that each of the multiple present technologies described herein can be independently implemented as long as there occurs no contradiction. As a matter of course, any multiple present technologies can be used in combination. For example, some or all of the present technology described in any of the embodiments can be combined with some or all of the present technology described in other embodiments and implemented. Furthermore, some or all of any present technology described above can be implemented in combination with another technology which has not been described above.

<Example of Configuration Combination>

Note that the present technology can also be configured as follows.

(1)

A communication apparatus including:
    a transmission unit that, when a packet is distributed to a plurality of lanes and transmitted to a communication apparatus on a receiving side, transmits at least one of a packet header or a packet footer of the packet independently in each of the lanes.

(2)

The communication apparatus according to (1) described above, further including:
    a packet footer generation unit that generates, as the packet footer in each of the lanes, cyclic redundancy check (CRC) calculated from a payload of the packet distributed to each of the lanes corresponding thereto.

(3)

The communication apparatus according to (1) or (2) described above, further including:
    a packet header generation unit that generates the packet header in each of the lanes, including word count indicating the number of bytes of a payload of the packet distributed to each of the lanes corresponding thereto.

(4)

The communication apparatus according to any one of (1) to (3) described above, further including:
    a payload header generation unit that generates a payload header placed at the head of a payload of the packet, in which the transmission unit transmits the payload header independently in each of the lanes, and the payload header includes message count that is incremented in each of the lanes, and includes, as needed, a lane number that identifies each of the lanes to be transmitted.

(5)
A communication method including:
when a packet is distributed to a plurality of lanes and transmitted to a communication apparatus on a receiving side, transmitting, by a communication apparatus, at least one of a packet header or a packet footer of the packet independently in each of the lanes.

(6)
A program for causing a computer of a communication apparatus to execute a communication process, the process including:
when a packet is distributed to a plurality of lanes and transmitted to a communication apparatus on a receiving side, transmitting at least one of a packet header or a packet footer of the packet independently in each of the lanes.

(7)
A communication apparatus including:
a reception unit that receives a packet distributed to a plurality of lanes and transmitted from a communication apparatus on a transmitting side,
in which at least one of a packet header or a packet footer of the packet is transmitted independently in each of the lanes.

(8)
The communication apparatus according to (7) described above,
in which the packet footer transmitted in each of the lanes is cyclic redundancy check (CRC) calculated from a payload of the packet distributed to each of the lanes corresponding thereto, and
the apparatus further includes:
an error processing unit that determines to stop using the lane in which the number of times a CRC error has been detected on the basis of the CRC is a predetermined number of times or more, and sets the communication apparatus on the transmitting side to stop using the lane.

(9)
The communication apparatus according to (7) or (8) described above,
in which the packet header transmitted in each of the lanes includes word count indicating the number of bytes of a payload of the packet distributed to each of the lanes corresponding thereto, and
the reception unit receives a payload of the packet transmitted by the lane that is normal out of a plurality of the lanes on the basis of the word count.

(10)
The communication apparatus according to any one of (7) to (9) described above,
in which a payload header is placed at the head of a payload of the packet, the payload header including message count that is incremented in each of the lanes and including, as needed, a lane number that identifies each of the lanes to be transmitted, and
the apparatus further includes:
an error processing unit that identifies the lane in which an anomaly has occurred out of a plurality of the lanes on the basis of the message count and the lane number, and sets the communication apparatus on the transmitting side to stop using the lane.

(11)
The communication apparatus according to any one of (7) to (10) described above, further including:
a notification unit that is directly connected to the communication apparatus on the transmitting side via a bus, and, when it is detected that a predetermined defect has occurred in the bus on the basis of a packet header or a packet footer of the packet, notifies another communication apparatus on a receiving side in a subsequent stage of error information indicating details of the defect.

(12)
A communication method including:
receiving, by a communication apparatus, a packet that is distributed to a plurality of lanes and transmitted from a communication apparatus on a transmitting side,
in which at least one of a packet header or a packet footer of the packet is transmitted independently in each of the lanes.

(13)
A program for causing a computer of a communication apparatus to execute a communication process, the process including:
receiving a packet that is distributed to a plurality of lanes and transmitted from a communication apparatus on a transmitting side,
in which at least one of a packet header or a packet footer of the packet is transmitted independently in each of the lanes.

Note that the present embodiments are not limited to the embodiments described above. Various modifications may be made without departing from the gist of the present disclosure. Furthermore, the effects described herein are merely examples and are not limited, and there may be another effect.

REFERENCE SIGNS LIST

11 Communication system
21 Image sensor
22 Application processor
23 Serializer
24 Deserializer
25 and 26 Bus
31 Extension mode-supporting CSI-2 transmitter
32 Extension mode-supporting CSI-2 receiver
33 CSI-2 receiver
34 SerDes transmitter
35 SerDes receiver
36 CSI-2 transmitter
41 Pixel
42 AD converter
43 Image signal processor
44 Pixel CRC calculation unit
45 Physical layer processing unit
46 I2C/I3C slave
47 Register
51 Packing unit
52 Packet header generation unit
53 Payload header generation unit
54 Payload footer generation unit
55 and 56 Selector
57 CRC calculation unit
58 Lane distribution unit
59 CCI slave
60 Controller
71 Physical layer processing unit
72 I2C/I3C master 73 Register
81 Packet header detection unit
82 Lane merging unit
83 Interpretation unit
84 and 85 Selector
86 CRC calculation unit
87 Unpacking unit
88 CCI master
89 Error notification packet generation unit

The invention claimed is:
1. A communication apparatus comprising:
a transmission circuitry, that, when portions of a single packet are distributed in parallel and across a plurality of lanes and transmitted to a communication apparatus on a receiving side, is configured to transmit an independent packet header of the single packet in each lane of the plurality of lanes,
wherein the independent packet header includes a cyclic redundancy check (CRC),
wherein the portions of the single packet are collectively an entirety of the single packet, and
wherein the independent packet header of the single packet in the each lane of the plurality of lanes includes information indicating a number of bytes of a respective payload of the single packet distributed to the each lane.
2. The communication apparatus according to claim 1, wherein the transmission circuitry is further configured to
transmit an independent packet footer of the single packet in the each lane of the plurality of lanes, and
generate, as the independent packet footer in the each lane of the plurality of lanes, a second cyclic redundancy check (CRC) calculated from the respective payload of the single packet distributed to the each lane.
3. The communication apparatus according to claim 1, wherein
the transmission circuitry is further configured to generate the independent packet header in the each lane, including a word count indicating the number of bytes of the respective payload of the single packet distributed to the each lane.
4. The communication apparatus according to claim 1, wherein
the transmission circuitry is further configured to generate an independent payload header placed at a head of the respective payload of the single packet distributed to the each lane,
wherein the transmission circuitry is further configured to transmit the independent payload header in the each lane the plurality of lanes, and
the independent payload header includes a message count that is incremented in the each lane, and includes, as needed, a lane number that identifies the each lane.
5. A communication method comprising:
distributing, with a communication apparatus, portions of a single packet in parallel and across a plurality of lanes; and
transmitting, with the communication apparatus, the portions of the single packet to a second communication apparatus on a receiving side in parallel to each other via the plurality of lanes,
wherein transmitting the single packet to the second communication apparatus on the receiving side further includes transmitting an independent packet header of the single packet in each of the plurality of lanes,
wherein the independent packet header includes a cyclic redundancy check (CRC),
wherein the portions of the single packet are collectively an entirety of the single packet, and
wherein the independent packet header of the single packet in the each lane of the plurality of lanes includes information indicating a number of bytes of a respective payload of the single packet distributed to the each lane.
6. A non-transitory computer-readable medium comprising a program that, when executed by an electronic processor, causes the electronic processor to perform a set of operations comprising:
distributing portions of a single packet in parallel and across a plurality of lanes; and
transmitting the portions of the single packet to a communication apparatus on a receiving side in parallel to each other via the plurality of lanes,
wherein transmitting the single packet to the communication apparatus on the receiving side further includes transmitting an independent packet header of the single packet in each of the plurality of lanes, and
wherein the independent packet header includes a cyclic redundancy check (CRC),
wherein the portions of the single packet are collectively an entirety of the single packet, and
wherein the independent packet header of the single packet in the each lane of the plurality of lanes includes information indicating a number of bytes of a respective payload of the single packet distributed to the each lane.
7. A communication apparatus comprising:
a reception circuitry configured to
receive portions of a single packet distributed in parallel and across a plurality of lanes and transmitted from a second communication apparatus on a transmitting side, and
receive an independent packet header of the single packet in each of the plurality of lanes,
wherein the independent packet header includes a cyclic redundancy check (CRC),
wherein the portions of the single packet are collectively an entirety of the single packet, and
wherein the independent packet header of the single packet in the each lane of the plurality of lanes includes information indicating a number of bytes of a respective payload of the single packet distributed to the each lane.
8. The communication apparatus according to claim 7, wherein the reception circuitry is further configured to
receive an independent packet footer of the single packet in each of the plurality of lanes,
wherein the independent packet footer includes a second cyclic redundancy check (CRC) calculated from the respective payload of the single packet distributed to the each lane, and
wherein the communication apparatus further includes an error processing circuitry configured to
determine a lane in which a number of times a CRC error has been detected on a basis of at least one of the CRC or the second CRC, and
set the second communication apparatus on the transmitting side to stop using the lane in which the number of times the CRC error has been detected exceeds a predetermined number.
9. The communication apparatus according to claim 7, wherein the independent packet header transmitted in the each lane of the plurality of lanes includes a word count indicating the number of the bytes of the respective payload of the single packet distributed to the each lane, and the reception circuitry is configured to determine the respective payload of the single packet transmitted by the each lane is normal on a basis of the word count.

10. The communication apparatus according to claim 7, wherein a payload header is placed at a head of the respective payload of the single packet, the payload header including a message count that is incremented in the each lane of the plurality of lanes and including, as needed, a lane number that identifies the each lane of the plurality of lanes to be transmitted, and the communication apparatus further includes an error processing circuitry configured to identify a lane in which an anomaly has occurred out of the plurality of lanes on a basis of the message count and the lane number, and set the second communication apparatus on the transmitting side to stop using the lane in which the anomaly has occurred.

11. The communication apparatus according to claim 7, further comprising:

a notification circuitry that is directly connected to the second communication apparatus on the transmitting side via a bus, wherein the notification circuitry is configured to detect that a predetermined defect has occurred in the bus on a basis of the independent packet header or an independent packet footer of the single packet, and notify another communication apparatus on a receiving side in a subsequent stage of error information indicating details of the predetermined defect.

12. A communication method comprising:

receiving, by a communication apparatus, portions of a single packet that are distributed in parallel and across a plurality of lanes and transmitted from a communication apparatus on a transmitting side; and receiving, by the communication apparatus, an independent packet header of the single packet in each of the plurality of lanes, wherein the independent packet header includes a cyclic redundancy check (CRC), wherein the portions of the single packet are collectively an entirety of the single packet, and wherein the independent packet header of the single packet in the each lane of the plurality of lanes includes information indicating a number of bytes of a respective payload of the single packet distributed to the each lane.

13. The communication method according to claim 12, further comprising:

receiving an independent packet footer of the single packet in the each lane of the plurality of lanes, wherein the independent packet footer includes a second cyclic redundancy check (CRC) calculated from the respective payload of the single packet distributed to the each lane, and determining a lane in which a number of times a CRC error has been detected on a basis of at least one of the CRC or the second CRC, and setting the communication apparatus on the transmitting side to stop using the lane in which the number of times the CRC error has been detected exceeds a predetermined number of times.

14. The communication method according to claim 12, wherein the independent packet header transmitted in the each lane of the plurality of lanes includes a word count the number of the bytes of the respective payload of the single packet distributed to the each lane, and the communication method further comprising determining the respective payload of the single packet transmitted by the lane is normal on a basis of the word count.

15. The communication method according to claim 12, wherein a payload header is placed at a head of the respective payload of the single packet, the payload header including a message count that is incremented in the each lane of the plurality of lanes and including, as needed, a lane number that identifies the each lane of the plurality of lanes to be transmitted, and the communication method further comprising identifying a lane in which an anomaly has occurred out of the plurality of lanes on a basis of the message count and the lane number, and setting the communication apparatus on the transmitting side to stop using the lane in which the anomaly has occurred.

16. A non-transitory computer-readable medium comprising a program, that when executed by an electronic processor, causes the electronic processor to perform a set of operations comprising:

receiving portions of a single packet that are distributed in parallel and across a plurality of lanes and transmitted from a communication apparatus on a transmitting side; and receiving an independent packet header of the single packet in each of the plurality of lanes, wherein the independent packet header includes a cyclic redundancy check (CRC), wherein the portions of the single packet are collectively an entirety of the single packet, and wherein the independent packet header of the single packet in the each lane of the plurality of lanes includes information indicating a number of bytes of a respective payload of the single packet distributed to the each lane.

17. The non-transitory computer-readable medium according to claim 16, wherein the set of operations further includes receiving an independent packet footer of the single packet in the each lane of the plurality of lanes, wherein the independent packet footer includes a second cyclic redundancy check (CRC) calculated from the respective payload of the single packet distributed to the each lane, and determining a lane in which a number of times a CRC error has been detected on a basis of at least one of the CRC or the second CRC, and setting the communication apparatus on the transmitting side to stop using the lane in which the number of times the CRC error has been detected exceeds a predetermined number.

18. The non-transitory computer-readable medium according to claim 16, wherein the independent packet header transmitted in the each lane of the plurality of lanes includes a word count indicating the number of the bytes of the respective payload of the single packet distributed to the each lane, and wherein the set of operations further includes determining the respective payload of the single packet transmitted by the each lane is normal on a basis of the word count.

19. The non-transitory computer-readable medium according to claim 16,
  wherein a payload header is placed at a head of the respective payload of the single packet, the payload header including a message count that is incremented in the each lane of the plurality of lanes and including, as needed, a lane number that identifies the each lane of the plurality of lanes to be transmitted, and
  wherein the set of operations further includes
    identifying a lane in which an anomaly has occurred out of the plurality of lanes on a basis of the message count and the lane number, and
    setting the communication apparatus on the transmitting side to stop using the lane in which the anomaly has occurred.

20. The non-transitory computer-readable medium according to claim 16, wherein the set of operations further includes
  detecting that a predetermined defect has occurred in a bus on a basis of the independent packet header or an independent packet footer of the single packet, and
  notifying another communication apparatus on a receiving side in a subsequent stage of error information indicating details of the predetermined defect.

* * * * *